(12) United States Patent
Nishiyama et al.

(10) Patent No.: US 9,618,922 B2
(45) Date of Patent: Apr. 11, 2017

(54) CPU OF PLC, SYSTEM PROGRAM FOR PLC, AND RECORDING MEDIUM STORING SYSTEM PROGRAM FOR PLC

(71) Applicant: OMRON CORPORATION, Kyoto (JP)

(72) Inventors: Yoshihide Nishiyama, Kanagawa (JP); Osamu Hamasaki, Kyoto (JP); Shigeyuki Eguchi, Kyoto (JP); Yoshihide Tamura, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 890 days.

(21) Appl. No.: 14/017,929

(22) Filed: Sep. 4, 2013

(65) Prior Publication Data

US 2014/0012402 A1    Jan. 9, 2014

Related U.S. Application Data

(63) Continuation of application No. PCT/JP2011/056769, filed on Mar. 22, 2011.

(30) Foreign Application Priority Data

Mar. 15, 2011   (JP) .................................. 2011-056767

(51) Int. Cl.
   *G06F 9/46*    (2006.01)
   *G05B 19/042*  (2006.01)
   (Continued)

(52) U.S. Cl.
   CPC ......... *G05B 19/0426* (2013.01); *G05B 19/05* (2013.01); *G06F 9/4887* (2013.01);
   (Continued)

(58) Field of Classification Search
   None
   See application file for complete search history.

(56) References Cited

U.S. PATENT DOCUMENTS

2003/0225812 A1* 12/2003 Nagashima ........ G05B 19/4147
                                                  718/102
2009/0234471 A1*  9/2009 Chandhoke ........ G05B 19/0426
                                                  700/86

(Continued)

FOREIGN PATENT DOCUMENTS

EP        0294853 A2    12/1988
EP        0473086 A1     3/1992
(Continued)

OTHER PUBLICATIONS

U.S. Appl. No. 14/017,720 to Yoshihide Nishiyama et al., filed Sep. 4, 2013.
(Continued)

*Primary Examiner* — Kenneth Tang
(74) *Attorney, Agent, or Firm* — Greenblum & Bernstein, P.L.C.

(57) ABSTRACT

A scheduler causes a microprocessor to start execution of a first control program after a communication circuit transmits output data and receives input data in a control cycle following a control circle in which execution of the first control program has ended, and causes execution of an unexecuted portion of the first control program in a control cycle following a control cycle in which execution of the first control cycle has not ended.

14 Claims, 13 Drawing Sheets

(51) Int. Cl.
 *G05B 19/05* (2006.01)
 *G06F 9/48* (2006.01)
(52) U.S. Cl.
 CPC .............. *G05B 2219/13086* (2013.01); *G05B 2219/15079* (2013.01); *G05B 2219/15126* (2013.01); *G05B 2219/25419* (2013.01)

(56) References Cited

U.S. PATENT DOCUMENTS

| 2010/0174387 A1* | 7/2010 | Ono | G05B 19/05 700/23 |
|---|---|---|---|
| 2010/0199002 A1* | 8/2010 | Izumi | G05B 19/05 710/61 |

FOREIGN PATENT DOCUMENTS

| EP | 1291744 A2 | 3/2003 |
|---|---|---|
| JP | 60-101612 | 6/1985 |
| JP | 4-372022 | 12/1992 |
| JP | 11-219211 | 8/1999 |
| JP | 2000-105604 | 4/2000 |
| JP | 2003-345406 | 12/2003 |
| JP | 2004-38555 | 2/2004 |
| JP | 2005-267335 | 9/2005 |
| JP | 2006-48231 | 2/2006 |
| JP | 2007-140655 | 6/2007 |

OTHER PUBLICATIONS

U.S. Appl. No. 14/017,684 to Yoshihide Nishiyama et al., filed Sep. 4, 2013.
U.S. Appl. No. 14/017,904 to Yoshihide Nishiyama et al., filed Sep. 4, 2013.
International Search Report in PCT/JP2011/056769, along with English language translation, mailing date Jun. 7, 2011.
International Preliminary Report on Patentability in PCT/JP2011/056769, along with an English language translation, dated Feb. 17, 2012.
Extended European Search Report in EP11861122.7, dated Sep. 11, 2014.

* cited by examiner

CPU OF PLC, SYSTEM PROGRAM FOR PLC, AND RECORDING MEDIUM STORING SYSTEM PROGRAM FOR PLC

CROSS-REFERENCE TO RELATED APPLICATIONS

This is a continuation application of PCT/JP/2011/056769 filed Mar. 22, 2011, designating the United States of America, the disclosure of which, including the specification, drawings, and claims, is incorporated by reference in its entirety. The disclosure of Japanese Patent Application No. 2011-056767 filed Mar. 15, 2011, including the specification, drawings, and claims is expressly incorporated herein by reference in its entirety.

FIELD OF DISCLOSURE

The present disclosure relates to scheduling of control operations, including output processing, input processing, calculation processing, and the like in a PLC (Programmable Logic Controller, also referred to as a programmable controller) used to control operations of a machine or equipment.

The PLC includes a plurality of units, such as, for example, a CPU (Central Processing Unit) unit and an I/O (Input/Output) unit, the CPU unit including a microprocessor that executes user programs, the I/O unit inputting signals from external switches and sensors and outputting signals to external relays and actuators. The PLC executes control operations between the units for execution cycle of a control program by transferring and receiving data through at least one of a PLC system bus and a field network.

TECHNICAL FIELD

For example, Patent Literature 1 (Japanese Patent Laid-Open Publication No. 2000-105604) discloses a technology in which scan time (a period of an execution cycle) for a sequence of execution of output refreshing (output processing), input refreshing (input processing), and sequence program execution (calculation processing) is made constant in a PLC. The principle of this technology is to set a constant scan set time that is longer than the time the sequence of execution is expected to require. Then, after each sequence of execution is performed, the next cycle of the sequence of execution is started after waiting until elapsed time from the beginning of the sequence of execution of the current cycle reaches the constant scan set time. In this method, the elapsed time is not compared to the constant scan set time during the sequence of execution. Thus, in a case where the sequence of execution continues beyond the constant scan set time for some reason, the cycle is extended until the sequence of execution is completed. Therefore, the period of an execution cycle cannot be constant.
Patent Literature 1: Japanese Patent Laid-Open Publication No. 2000-105604

BACKGROUND

In the field of information technology, speeds of microprocessors and communication networks have been improving. Therefore, with application of the technology to a PLC, a period of an execution cycle of a control program has been shortening. Accordingly, it is becoming advantageous to make constant, with a high degree of precision, a period of control data (input data and output data) communication performed between a CPU unit of the PLC and other units.

When the period of control data communication within the PLC is constant, it becomes easier to make a period for updating an output signal constant, the output signal being provided to an external device from the I/O unit. Thus, it also becomes easier for an external device to perform an operation in synchronization with a period of a control cycle of the PLC.

Furthermore, when the period of control data communication is constant, it becomes possible for a remote I/O terminal to perform a precisely time-controlled scheduled operation, such as obtaining input data from outside just before a scheduled time to transmit input data to the CPU unit, the remote I/O terminal communicating with the CPU unit via a field network. Thereby, the CPU unit can perform calculation processing using newest obtainable input data. Therefore, in conjunction with the shortened period of the control cycle, response time from obtaining input data to transmission of output data can be shortened, the output data being a result of calculation using the input data.

Furthermore, when the period of control data communication is constant, any one of the units in the PLC can promptly determine that a communication abnormality has occurred by detecting that the communication has not been carried out at a planned time.

In addition, when direct communication is carried out via the field network between the CPU unit and a controlled device outside of the PLC, such as a servo motor driver, the period of control data communication via the field network can be made constant, which is advantageous. Since it is becoming possible to shorten the period of the execution cycle of the PLC such that the period of the execution cycle of the PLC can be used as a control period of a servo motor, the CPU unit of the PLC can also control a motor by generating and outputting an instruction value to the servo motor driver for each execution cycle without a separate specialized motion controller. However, in such a case, it is important that the CPU unit be able to transmit an output signal at a constant period in order to control the motor with a high degree of precision.

Furthermore, the technical scope of the CPU unit of the PLC according to the present disclosure is not limited to a function of a conventional CPU unit which carries out control mainly by executing a sequence program, but also includes a CPU unit having an extended function, such as an added function of a motion controller.

Moreover, time required to execute a control program (a sequence program, a motion calculation program, and the like) may be different each time execution of the control program is repeated. A distribution of this execution time often shows a tendency in which the execution time is relatively short and has low variation in most cases of execution, while a small number of cases have a relatively long execution time.

The execution time has such a distribution because execution sometimes includes processing that is performed by the control program only when a specific condition is satisfied. In a cycle in which such a condition is satisfied, a greater amount of processing is performed than processing in other cycles, and thus execution time becomes longer. Examples of a case having a longer execution time includes a case in which initial processing is performed for many axes in a cycle satisfying a starting condition of a motion command, such as a motion function block used in a sequence program (user program). This initial processing includes processing to calculate a motion instruction value in each cycle in or after the cycle satisfying the starting condition of the motion command.

In the constant period system for the execution cycle as shown in Patent Literature 1 (Japanese Patent Laid-Open Publication No. 2000-105604), the communication period can only be constant when the period of the execution cycle is set longer than a maximum execution time of the control program.

However, when the period of the execution cycle is set to be longer than the maximum execution time of the control program, a short execution cycle period suitable for a short execution time cannot be attained even when the control program completes execution in a shorter time in most of the cycles.

Considering sporadic long execution times of the control program, the present disclosure aims to provide a CPU unit of a PLC which can set a period of communication for output and input of control data by the CPU unit of the PLC to be a constant period shorter than a maximum execution time of the control program.

SUMMARY OF THE DISCLOSURE

An aspect of the present disclosure provides a CPU unit of a PLC controlling a control target. The CPU unit of the PLC includes a microprocessor, a memory means (a memory), a communication circuit transmitting output data and receiving input data, and a means setting a period of a control cycle (a setter or a setting unit). The CPU unit of the PLC is configured so as to control the control target by repeating transmission of the output data, reception of the input data, and execution of a first control program that generates the output data using the input data. The memory means is used to store the first control program and a scheduler program controlling execution of the first control program. The microprocessor executes the scheduler program and the first control program, which are stored in the memory means. The communication circuit transmits the output data and receives the input data for every control cycle. The scheduler program includes a command causing the microprocessor to start execution of the first control program after the communication circuit transmits the output data and receives the input data, in a control cycle following it control cycle in which the first control program has ended execution; and a command causing the microprocessor to execute an unexecuted portion of the first control program in a control cycle following a control cycle in which the first control program has not ended execution.

According to this aspect, in a situation where execution of the first control program sporadically requires a longer amount of time to complete, a user of the PLC can set a period of communication to a fixed amount of time shorter than a maximum value of the time required to complete execution of the first control program, the communication being performed by the CPU unit of the PLC in synchronization with a control cycle to output and input control data.

Preferably, the first control program includes a motion calculation program calculating at every execution an instruction value to be output to a motor driver. The motion calculation program requires an amount of time for first execution longer than an amount of time required for subsequent execution due to execution of initial processing required to start calculation of the instruction value in the first execution started by a user program created in accordance with a control purpose of a user.

According to this aspect, in the control cycle after the control cycle started by the motion calculation program (motion start cycle), an execution period of the motion calculation program does not exceed the control cycle. When the period of the control cycle is set short enough that the execution period may exceed the control cycle, however, it is possible to attain motion control in which the period of the control cycle is short and also the period is rarely exceeded during a motion operation.

More preferably, the first control program further includes the user program. Preferably, the memory means is further used to store a second control program whose execution cycle period is set to an integer multiple of a control cycle period, the integer being at least 2. The scheduler program includes a command causing the microprocessor to execute the second control program in accordance with the execution cycle in an amount of time within the control cycle after completion of the first control program.

According to this aspect, processing, which is not influenced even when the period of the execution cycle thereof becomes longer than the period of the control cycle, is performed as the second control program. Thereby, an amount of processing by the first control program can be reduced. Therefore, the period of the control cycle is able to be further reduced. In addition, it may be possible to reduce a frequency with which the first control program does not end execution within one control cycle. Moreover, it may be possible to reduce a frequency with which the first control program does not end execution within a number of control cycles exceeding an expected number.

Alternatively, preferably, the memory means is further used to store a second control program whose execution cycle period is set to an integer multiple of the control cycle period, the integer being at least 2. The scheduler program includes a command causing the microprocessor to execute the second control program in accordance with the execution cycle in an amount of time within the control cycle after completion of the first control program. The first control program includes the motion calculation program, and the second control program includes the user program.

Preferably, the memory means is further used to store setting information setting a count limit for the number of control cycles in which the first control program continues one execution, and an abnormal processing program executed when one execution of the first control program does not end within the limited number of control cycles. The scheduler program includes a command causing, in a case where the number of control cycles for which one execution of the first control program continues reaches the count limit and where execution of the first control program has not ended within the control cycle, the microprocessor to execute in the next control cycle the abnormal processing program without executing the unexecuted portion of the first control program.

According to this aspect, in a case where an abnormal situation arises such as execution of the first control program continuing beyond the expected number of control cycles, the abnormal processing program is executed while execution of the control program is suspended. Thereby, improved safety can be ensured.

Preferably, the communication circuit is configured so as to start transmission of the output data and reception of the input data controlled by the microprocessor. The scheduler program further includes a command causing the communication circuit to start the communication for each control cycle.

According to this aspect, the microprocessor collectively administrates the control cycles. Thus, no special hardware is required in the communication circuit in order to communicate at a constant period.

More preferably, the scheduler program further includes a command causing, in a case where execution of the first control program has not ended within a control cycle, the communication circuit to execute in the next control cycle processing to start communication in preference to the unexecuted portion of the first control program, and then causing the microprocessor to execute the unexecuted portion of the first control program.

According to this aspect, the fixed periodicity of the communication can be maintained even when a single-core microprocessor controls the initiation of communication and when the first control program is executed over a plurality of control cycles.

Preferably, the CPU unit of the PLC further includes a timer circuit generating a signal with the period of the control cycle. The communication circuit is configured so as to start transmission of the output data and reception of the input data, triggered by the signal generated by the timer circuit.

According to this aspect, initiation of communication by the communication circuit is triggered by the signal generated by the timer circuit at the period of the control cycle. Thereby, an amount of processing by the scheduler program can be reduced. Therefore, in the control cycle in which the unexecuted portion of processing included in the first control program is executed, the scheduler program can allocate a greater amount of time for execution of the unexecuted portion of the processing included in the control program. As a result, a possibility can be increased that execution of the unexecuted portion of the processing included in the first control program ends in the current control cycle.

Preferably, the microprocessor includes a first and second core. The first core executes the scheduler program, and the second core executes the first control program. The scheduler program includes a command causing the microprocessor to execute the unexecuted portion of the first control program in the control cycle following the control cycle in which execution of the first control program has not ended by not interrupting execution of the first control program.

Another aspect of the present disclosure provides a system program for a PLC. The system program for the PLC is stored in a memory means (a memory) and executed by a microprocessor in a CPU unit of the PLC. The CPU unit of the PLC includes the microprocessor, the memory means, and a communication circuit transmitting output data and receiving input data; and controls a control target by repeating, for each control cycle, transmission of the output data and reception of the input data with the communication circuit, and by repeating execution of a first control program which is stored in the memory means and generates the output data using the input data. The system program for the PLC includes a scheduler program controlling execution of the first control program and a program setting a period of the control cycle. The scheduler program includes a command causing the microprocessor to start execution of the first control program after the communication circuit transmits the output data and receives the input data, in a control cycle following a control cycle in which the first control program has ended execution; and a command causing the microprocessor to execute an unexecuted portion of the first control program in a control cycle following a control cycle in which the first control program has not ended execution.

Preferably, the system program for the PLC includes a motion calculation program that calculates, at every execution, an instruction value output to a motor driver. The motion calculation program is at least a portion of the first control program. The motion calculation program requires an amount of time for a first execution longer than an amount of time required for subsequent execution due to execution of initial processing required to start calculation of the instruction value in the first execution started by a user program that is generated in accordance with a control purpose of a user.

Still another aspect of the present disclosure provides a recording medium storing a system program for a PLC. The system program for the PLC is stored in a memory means (a memory) and executed by a microprocessor in a CPU unit of the PLC, the CPU unit of the PLC including the microprocessor, the memory means, and a communication circuit transmitting output data and receiving input data; and controlling a control target by repeating, for each control cycle, transmission of the output data and reception of the input data with the communication circuit, and repeating execution of a first control program that is stored in the memory means and generates the output data using the input data. The system program for the PLC includes a scheduler program controlling execution of the first control program and a program setting a period of the control cycle. The scheduler program includes a command causing the microprocessor to start execution of the first control program after the communication circuit transmits the output data and receives the input data, in a control cycle following a control cycle in which the first control program has ended execution; and a command causing the microprocessor to execute an unexecuted portion of the first control program in a control cycle following a control cycle in which the first control program has not ended execution.

Preferably, the system program for the PLC includes a motion calculation program that calculates an instruction value output to a motor driver at every execution. The motion calculation program is at least a portion of the first control program. The motion calculation program requires an amount of time for a first execution longer than an amount of time required for subsequent execution due to execution of initial processing required to start calculation of an instruction value in the first execution started by a user program generated in accordance with a control purpose of a user.

Moreover, in the present specification "command" ("meirei" in Japanese) is not limited to individual commands appearing in source code of a program in order to achieve a given function, but instead also refers to an aggregation of such individual commands, mathematical functions, and the like and may be expressed in a plural form, as in "instructions" in English, for example.

According to the present disclosure, in a situation where execution time of a first control program sporadically becomes long, a user of a PLC can set a period of communication to a fixed amount of time shorter than a maximum execution time of the first control program, the communication being performed by a CPU unit of the PLC in synchronization with a control cycle in order to output and input control data.

According to an aspect of the present disclosure, a central processing unit (CPU) unit of a programmable logic controller (PLC) is provided, including a microprocessor that executes a first control program and a scheduler program, the first control program, when executed by the microprocessor, generates output data using input data, and the scheduler program, when executed by the microprocessor, controls execution of the first control program. A memory stores the first control program and the scheduler program. A setting unit (a setter) determines a period of a control cycle and a communication circuit transmits the output data and receives input data for every control cycle. The scheduler program, when executed by the microprocessor causes the microprocessor to start execution of the first control program after the communication circuit transmits the output data and receives the input data, in a control cycle following a control cycle in which Inc first control program has ended. The scheduler program also causes the microprocessor to execute an unexecuted portion of the first control program in a control cycle following a control cycle in which the first control program has not ended. The CPU unit is configured to control a control target of the PLC by repeating transmission of the output data, reception of the input data, and execution of the first control program.

The first control program further includes a motion calculation program, that when executed by them microprocessor, calculates an instruction value to be output to a motor driver, and the motion calculation program requires an amount of time for first execution longer than an amount of time for subsequent execution, the first execution requires initial processing to start calculation of the instruction value, and the first execution is started by a user program created in accordance with a control purpose of a user. The first control program further includes the user program.

The memory also stores a second control program, a period of an execution cycle of the second control program being at least twice as fast as the period of the control cycle, and the scheduler program, when executed by the microprocessor, causes the microprocessor to execute the second control program in accordance with the execution cycle within the control cycle and after completion of the first control program. The memory may also store a second control program, a period of an execution cycle of the second control program being at least twice as fast as the period of the control cycle, and the scheduler program, when executed by the microprocessor, causes the microprocessor to execute the second control program in accordance with the execution cycle within the control cycle and after completion of the first control program, and the first control program includes the motion calculation program, and the second control program includes the user program.

The memory may also store setting information and an abnormal processing program, in which the setting information sets a count limit for a number of control cycles over which the first control program continues one execution, and the abnormal processing program is executed by the microprocessor when the number of control cycles is over the count limit, and the scheduler program, when executed by the microprocessor, and when the number of control cycles reaches the count limit and when execution of the first control program has not ended within the control cycle, executes the abnormal processing program without executing the unexecuted portion of the first control program in the following control cycle.

The communication circuit is configured to start transmission of the output data and reception of the input data controlled by the microprocessor, and the scheduler program, when executed by the microprocessor causes the communication circuit to start the communication for every control cycle. The scheduler program, when executed by the microprocessor, and when execution of the first control program has not ended within a control cycle, causes the communication circuit to start the communication and then executes the unexecuted portion of the first control program in the following control cycle.

The CPU unit further includes a timer circuit generating a signal with the period of the control cycle, and the communication circuit is configured to start transmission of the output data and reception of the input data, triggered by the signal generated by the timer circuit. The microprocessor includes a first and a second core, the first core executes the scheduler program, and the second core executes the first control program, and the scheduler program, when executed by the microprocessor, executes the unexecuted portion of the first control program in the control cycle following the control cycle in which execution of the first control program has not ended so that the execution of the first control program is not interrupted.

According to another aspect of the disclosure, a system is provided for controlling programmable logic controller (PLC). The system includes a memory that stores executable instructions, a microprocessor of a central processing unit (CPU) that executes the executable instructions, and a communication circuit configured to transmit output data and receive input data. The CPU unit controls a control target by repeating, for each control cycle, transmission of the output data and reception of the input data with the communication circuit, and by repeating execution of a first control program which is stored in the memory and generates the output data using the input data. A scheduler controls execution of the first control program and setting unit (a setter) sets a period of a control cycle, in which the scheduler causes the microprocessor to start execution of the first control program after the communication circuit transmits the output data and receives the input data, in a control cycle following a control cycle in which the first control program has ended execution. The scheduler causes the microprocessor to execute an unexecuted portion of the first control program in a control cycle following a control cycle in which the first control program has not ended execution. The PLC further includes a motion calculator that is at least a portion of the first control program and calculates at every execution an instruction value output to a motor driver. The motion calculator requires an amount of time for a first execution longer than an amount of time required for subsequent execution due to execution of initial processing required to start calculation of the instruction value in the first execution.

According to yet another aspect of the disclosure, a non-transitory computer readable storage medium encoded with an executable computer program for a PLC is provided and that, when executed by a microprocessor, causes the microprocessor to perform operations including transmitting output data and receiving input data via a communication circuit, controlling a control target by repeating, for each control cycle, transmission of the output data and reception of the input data with the communication circuit, and by repeating execution of a first control program that generates the output data using the input data, controlling execution of the first control program, setting a period of a control cycle, starting execution of the first control program after the communication circuit transmits the output data and receives the input data, in a control cycle following a control cycle in which the first control program has ended execution; and executing an unexecuted portion of the first control program in a control cycle following a control cycle in which the first control program has not ended execution.

Additionally, the microprocessor may also perform operations comprising calculating an instruction value output to a motor driver, in which an amount of time for a first calculation of an instruction value is longer than an amount of time required for subsequent calculation of an instruction value due to initial processing required to start a calculation of motion instruction data generated in accordance with a control purpose of a user.

DETAILED DESCRIPTION

Figure 1:
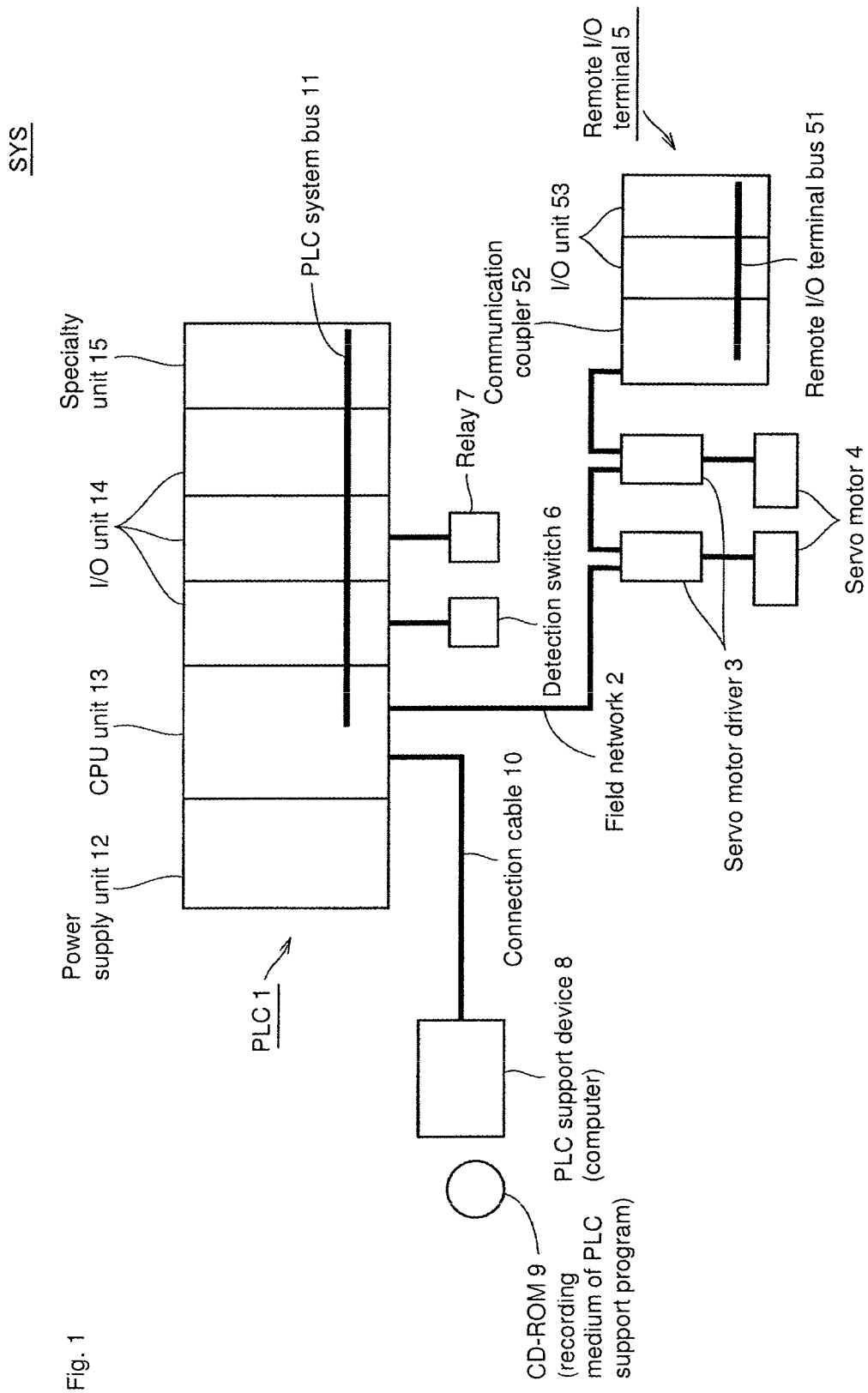
FIG. 1 is a schematic view illustrating an overview configuration of a PLC system according to embodiments of the present disclosure.

A detailed description of embodiments according to the present disclosure is given with reference to the drawings. Identical or equivalent portions in the drawings are given identical reference numerals and descriptions thereof are not reiterated.

A. System Configuration

A PLC according to the present embodiments controls a control target such as a machine and equipment. First, with reference to FIG. 1, a description is given of a system configuration of a PLC 1 according to the present embodiments.

FIG. 1 is a schematic view illustrating an overview configuration of a PLC system according to the embodiments of the present disclosure. With reference to FIG. 1, a PLC system SYS includes the PLC 1, a servo motor driver 3 and remote I/O terminal 5 connected to the PLC 1 by a field network 2, and a detection switch 6 and relay 7 configuring a field instrument. In addition, a PLC support device 8 is connected to the PLC 1 via a connection cable 10 or the like.

The PLC 1 includes a CPU unit 13 executing principal calculation processing, one or more I/O units 14, and a specialty unit 15. These units are configured so as to be capable of mutually exchanging data via a PLC system bus 11. Further, power of an appropriate voltage is supplied to these units by a power supply unit 12. In addition, each unit configuring the PLC 1 is provided by a PLC manufacturer; therefore, the PLC system bus 11 is typically independently developed by each PLC manufacturer for use. In contrast, the field network 2 described below is capable of connecting products from different manufacturers and standards for these products are often publicly available.

Details of the CPU unit 13 are described below with reference to FIG. 2. The I/O unit 14 is a unit related to general input/output processing and handles input/output of data binarized to be ON or OFF. In other words, the I/O unit 14 collects information about whether a sensor such as the detection switch 6 is detecting some target (is ON) or not detecting some target (is OFF). In addition, the I/O unit 14 outputs to an output recipient (such as the relay 7 or an actuator) one of an instruction to activate (ON) and an instruction to deactivate (OFF).

The specialty unit 15 includes functions not supported by the I/O unit 14, such as input/output of analog data, temperature control, and communication using a specific communication method.

The field network 2 transmits various kinds of data exchanged with the CPU unit 13. As the field network 2, typically, various kinds of industrial Ethernets® can be used. Known examples of the industrial Ethernet® include EtherCAT®, Profinet IRT, MECHATROLINK®-III, Powerlink, SERCOS®-III, and CIP Motion, any of which may be used. Moreover, a field network other than the industrial Ethernet® may also be used. For example, when motion control is not performed, DeviceNet, CompoNet/IP®, or the like may be used. In the PLC system SYS according to the present embodiments, a representative example is given in the present embodiments of a configuration where EtherCAT®, which is the industrial Ethernet®, is used as the field network 2.

FIG. 1 illustrates the PLC system SYS including both the PLC system bus 11 and the field network 2. However, a system configuration may be employed in which only one of the PLC system bus 11 and the field network 2 is provided. For instance, the field network 2 may be connected to all units. Alternatively, instead of using the field network 2, the servo motor driver 3 may be directly connected to the PLC system bus 11. Furthermore, a communication unit of the field network 2 may be connected to the PLC system bus 11 to communicate with devices connected to the field network 2 by way of the communication unit from the CPU unit 13.

In addition, by allocating functions of the I/O unit 14 and the servo motor driver 3 to the CPU unit 13, the PLC 1 may have a configuration in which the CPU unit 13 directly controls the control target without mediation by the I/O unit 14, the servo motor driver 3, or the like.

The servo motor driver 3 is connected to the CPU unit 13 via the field network 2, and also drives the servo motor 4 according to an instruction value from the CPU unit 13. More specifically, the servo motor driver 3 receives from the PLC 1 at a constant period an instruction value such as a position instruction value, speed instruction value, and torque instruction value. Further, the servo motor driver 3 obtains, from a detector such as a position sensor (rotary encoder) or torque sensor connected to a shaft of the servo motor 4, an actual measured value for movement of the servo motor 4 such as position, speed (typically calculated based on a difference between a current location and a previous location), and torque. Also, the servo motor driver 3 sets the instruction value from the CPU unit 13 to a desired value, then performs feedback control using the actual measured value as a feedback value. In other words, the servo motor driver 3 adjusts an electric current driving the servo motor 4 such that the actual measured value approaches the desired value. Moreover, the servo motor driver 3 may also be called a servo motor amplifier.

FIG. 1 depicts an exemplary system in which the servo motor 4 and the servo motor driver 3 are combined. However, other configurations can also be used, such as a system in which a pulse motor and a pulse motor driver are combined.

The remote I/O terminal 5 is further connected to the field network 2 of the PLC system SYS shown in FIG. 1. The remote I/O terminal 5, basically, performs processes related to general input/output processing similar to the I/O unit 14. More specifically, the remote I/O terminal 5 includes a communication coupler 52 for performing a process related to data transmission in the field network 2, and one or more I/O units 53. These units are configured so as to be capable of mutually exchanging data via a remote I/O terminal bus 51.

The PLC support device 8 is described below.

B. Hardware Configuration of CPU Unit

Figure 2:
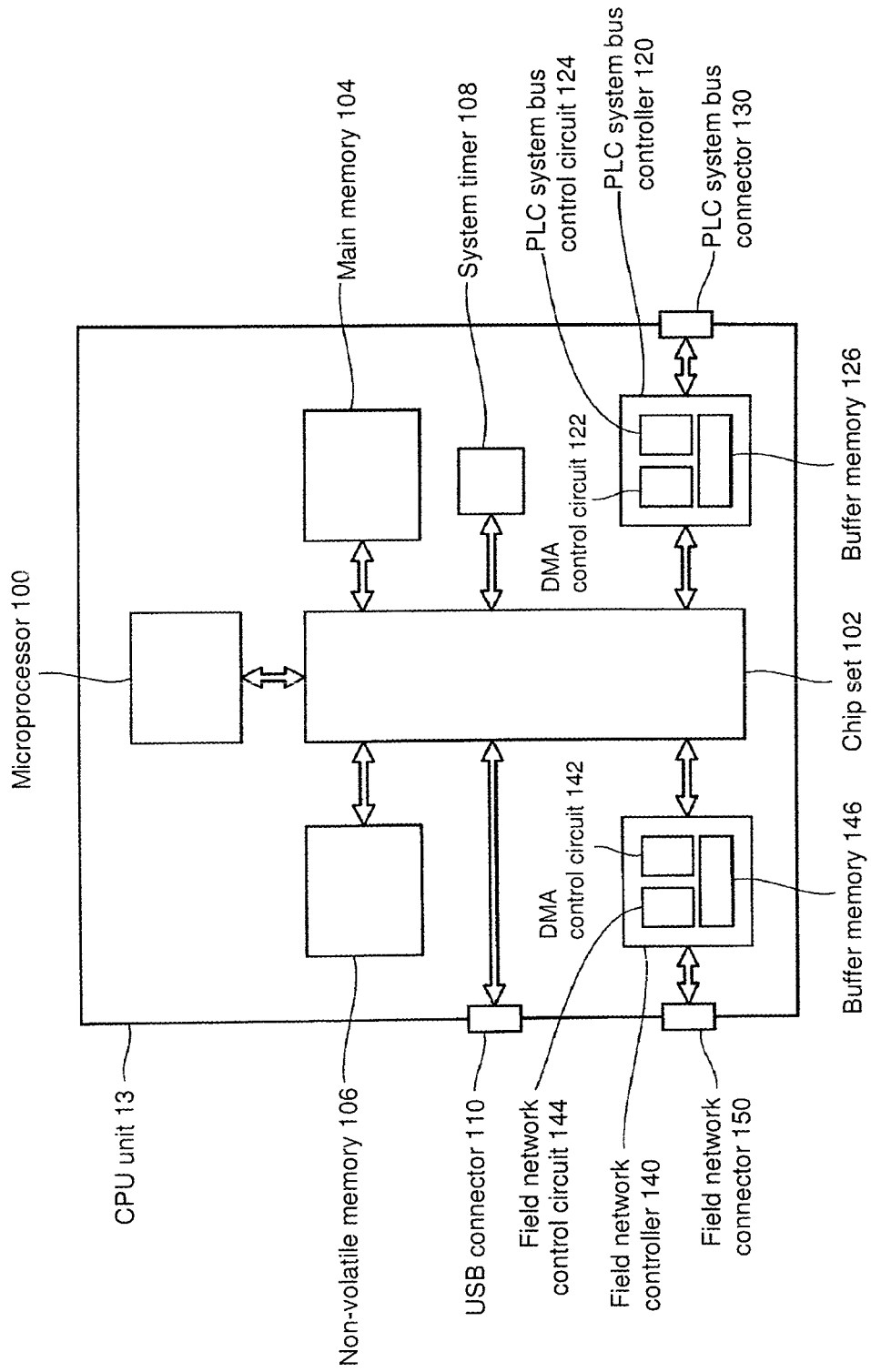
FIG. 2 is a schematic view illustrating a hardware configuration of a CPU unit according to the embodiments of the present disclosure.

Next, with reference to FIG. 2, a description is given of a hardware configuration of the CPU unit 13. FIG. 2 is a schematic view illustrating a hardware configuration of the CPU unit 13 according to the embodiments of the present disclosure. With reference to FIG. 2, the CPU unit 13 includes a microprocessor 100, a chip set 102, a main memory 104, a non-volatile memory 106, a system timer 108, a PLC system bus controller 120, a field network controller 140, and a USB connector 110. Connections between the chip set 102 and other components are each made by various types of bus.

The microprocessor 100 and the chip set 102, typically, are configured according to a general-purpose computer architecture. In other words, the microprocessor 100 interprets and executes an instruction code serially supplied from the chip set 102 according to an internal clock. The chip set 102 exchanges internal data with various connected components and also generates the required instruction code for the microprocessor 100. Moreover, the chip set 102 includes a function caching data and the like obtained as a result of executing calculation processing in the microprocessor 100.

The CPU unit 13 includes the main memory 104 and the non-volatile memory 106 as a memory means (a memory).

The main memory 104 is a volatile memory area (RAM) and holds various programs to be executed by the microprocessor 100 after power is supplied to the CPU unit 13. In addition, the main memory 104 is used as a task memory during execution of various programs by the microprocessor 100. A device such as a DRAM (Dynamic Random Access Memory) or SRAM (Static Random Access Memory) is used as the main memory 104 of this kind.

Meanwhile, the non-volatile memory 106 holds, in a non-volatile manner, data such as a realtime OS (Operating System), a PLC 1 system program, a user program, a motion calculation program, and system setting parameters. These programs and data are copied to the main memory 104 as needed to enable the microprocessor 100 to access them. A semiconductor memory, such as a flash memory, can be used as the non-volatile memory 106 of this kind. Alternatively, a magnetic recording medium such as a hard disk drive or an optical recording medium such as a DVD-RAM (Digital Versatile Disk Random Access Memory) or the like can be used.

The system timer 108 generates an interrupt signal for every constant period and provides the interrupt signal to the microprocessor 100. Typical configurations generate the interrupt signals on a plurality of different cycles according to hardware specifications. However, the interrupt signal can also be set to generate with a desired period according to an OS (Operating System), BIOS (Basic Input Output System), or the like. Using the interrupt signal generated by the system timer 108, a control operation is achieved for each control cycle (described below).

The CPU unit 13 includes the PLC system bus controller 120 and the field network controller 140 as communication circuits. These communication circuits transmit output data and receive input data.

Moreover, in the case where the CPU unit 13 is allocated the functions of the I/O unit 14 and the servo motor driver 3, transmission of output data and reception of input data by the communication circuit treat the component serving those functions as a recipient of the communication, and so transmission and reception are performed within the CPU unit 13.

The PLC system bus controller 120 controls the exchange of data via the PLC system bus 11. More specifically, the PLC system bus controller 120 includes a DMA (Dynamic Memory Access) control circuit 122, a PLC system bus control circuit 124, and a buffer memory 126. Moreover, the PLC system bus controller 120 is internally connected to the PLC system bus 11 via a PLC system bus connector 130.

The buffer memory 126 acts as a transmission buffer of data output to another unit via the PLC system bus 11 (hereafter also referred as "output data") and as a reception buffer of data input from another unit via the PLC system bus 11 (hereafter also referred as "input data"). The output data generated according to the calculation processing by the microprocessor 100 is originally stored in the main memory 104. Further, the output data, which is to be transferred to a specific unit, is retrieved from the main memory 104 and initially held in the buffer memory 126. The input data, which is transferred from the other unit, is moved to the main memory 104 after being initially held in the buffer memory 126.

The DMA control circuit 122 performs transfer of the output data from the main memory 104 to the buffer memory 126 and transfer of the input data from the buffer memory 126 to the main memory 104.

The PLC system bus control circuit 124 performs, between the other unit connected to the PLC system bus 11, a process transmitting the output data of the buffer memory 126 and a process receiving the input data and storing the input data in the buffer memory 126. Typically, the PLC system bus control circuit 124 provides a function of a physical layer and a data link layer in the PLC system bus 11.

The field network controller 140 controls the exchange of data via the field network 2. In other words, the field network controller 140 controls the transmission of the output data and the reception of the input data according to specifications of the field network 2 being used. As noted above, in the present embodiments, the field network 2 following the EtherCAT® standard is used. Therefore, the field network controller 140 is used that includes hardware for performing ordinary Ethernet® communication. In the EtherCAT® standard, a universal Ethernet® controller can be used in which a communication protocol obeying the ordinary Ethernet® standard is attained. However, depending on what kind of industrial Ethernet® is used as the field network 2, an Ethernet® controller is used which has particular specifications corresponding to a communication protocol having an exclusive-use specification different from the ordinary communication protocol. In addition, when a field network other than an industrial Ethernet® is used, an exclusive-use field network controller corresponding to the standard is used.

A buffer memory 146 acts as a transmission buffer of data output to another device via the field network 2 (hereafter, this data is also referred to as "output data") and as a reception buffer of data input from another device via the field network 2 (hereafter, this data is also referred to as "input data"). The output data generated according to the calculation processing by the microprocessor 100 is originally stored in the main memory 104, as noted above. Further, the output data, which is to be transferred to a specific device, is retrieved from the main memory 104 and temporarily held in the buffer memory 146. The input data, which is transferred from the other device, is moved to the main memory 104 after being temporarily held in the buffer memory 146.

A DMA control circuit 142 performs transfer of the output data from the main memory 104 to the buffer memory 146 and transfer of the input data from the buffer memory 146 to the main memory 104.

A field network control circuit 144 performs, between the other device connected to the field network 2, a process transmitting the output data of the buffer memory 146 and a process receiving the input data and storing the input data in the second buffer memory 146. Typically, the field network control circuit 144 provides a function of a physical layer and a data link layer in the field network 2.

The USB connector 110 is an interface for connecting the PLC support device 8 and the CPU unit 13. Typically, programs and the like transferred from the PLC support device 8 and executable by the microprocessor 100 of the CPU unit 13 are taken into the PLC 1 via the USB connector 110.

C. Software Configuration of CPU Unit

Figure 3:
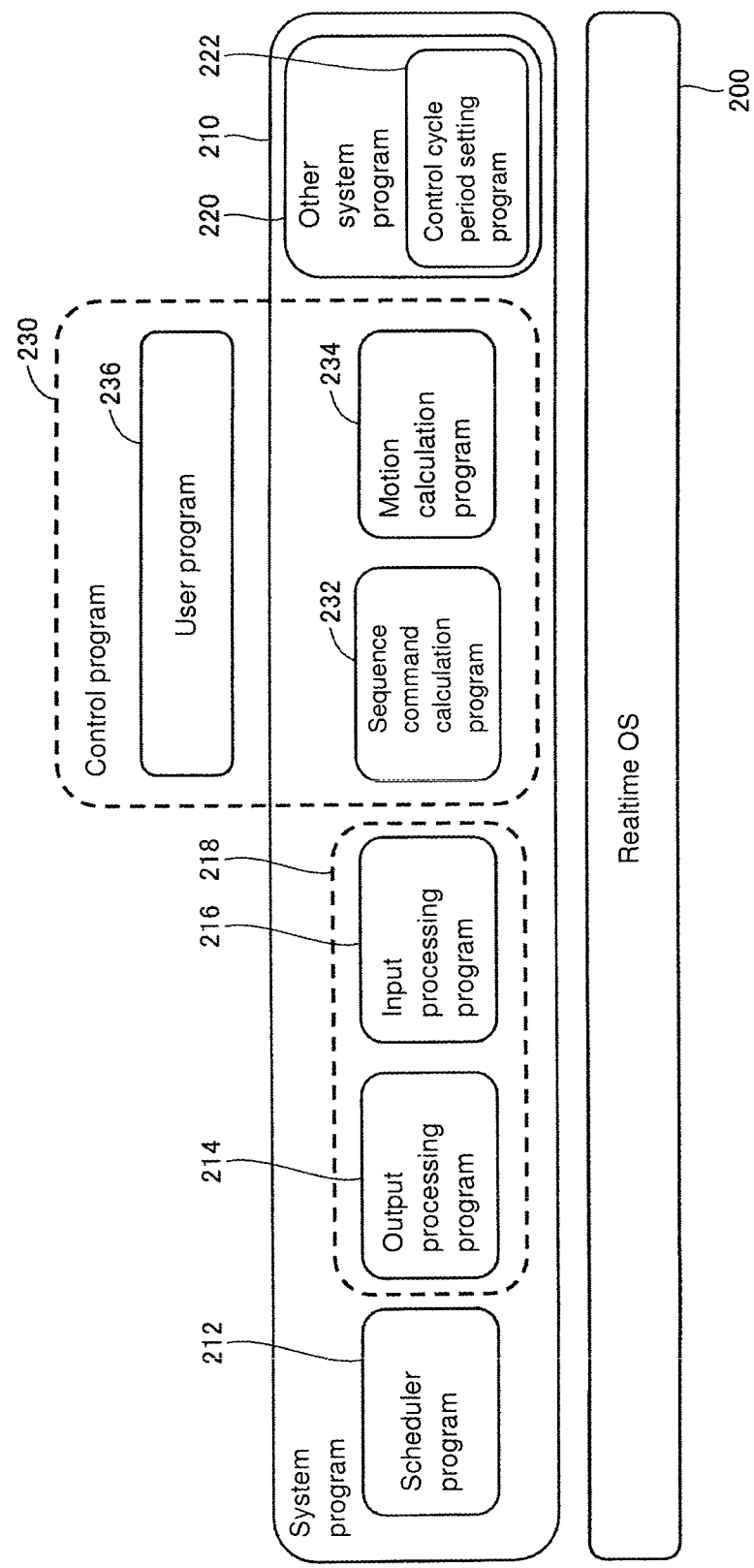
FIG. 3 is a schematic view illustrating a configuration of software executed by the CPU unit according to the embodiments of the present disclosure.

Next, with reference to FIG. 3, a description is given of a software suite for providing various functions according to the present embodiments. A command code included in the software is retrieved at an appropriate time and is executed by the microprocessor 100 of the CPU unit 13.

FIG. 3 is a schematic view illustrating a configuration of software executed by the CPU unit 13 according to embodiments of the present disclosure. With reference to FIG. 3, the software executed by the CPU unit 13 has three layers: a realtime OS 200, a system program 210, and a user program 236.

The realtime OS 200 is designed according to the computer architecture of the CPU unit 13 and provides a basic executable environment for the microprocessor 100 to execute the system program 210 and the user program 236. The realtime OS is typically provided by the PLC manufacturer, a dedicated software company, or the like.

The system program 210 is a software suite for providing functions of the PLC 1. Specifically, the system program 210 includes a scheduler program 212, an output processing program 214, an input processing program 216, a sequence command calculation program 232, a motion calculation program 234, and other system programs 220. Moreover, in general, the output processing program 214 and the input processing program 216 are executed consecutively (as a unit), and thus these programs may be collectively referred to as an I/O processing program 218.

The user program 236 is generated according to a control purpose of a user. In other words, the user program 236 is a program designed as desired according to a line (process) or the like to be controlled using the PLC system SYS.

As noted below, the user program 236 works together with the sequence command calculation program 232 and the motion calculation program 234 to achieve the control purpose of the user. In other words, the user program 236 utilizes a command, mathematical function, functional module, or the like provided by the sequence command calculation program 232 and the motion calculation program 234 in order to achieve a programmed operation. Therefore, the user program 236, sequence command calculation program 232, and motion calculation program 234 may be collectively referred to as a control program 230.

In this way, the microprocessor 100 of the CPU unit 13 executes the system program 210 and the user program 236 stored in the memory means.

Hereafter, each program is described in greater detail. As noted above, the user program 236 is generated according to the control purpose of the user (e.g., a line or process to be controlled). Typically, the user program 236 is in an object program format that can be executed by the microprocessor 100 of the CPU unit 13. The user program 236 is generated in the PLC support device 8 or the like by compiling a source program written in a ladder language or the like. In addition, the generated user program 236 in the object program format is transferred from the PLC support device 8 to the CPU unit 13 via the connection cable 10, and is then stored in the non-volatile memory 106 or the like.

The scheduler program 212 controls processing initiation in each execution cycle and processing restart after the processing is interrupted for the output processing program 214, the input processing program 216, and the control program 230. More specifically, the scheduler program 212 controls execution of the user program 236 and the motion calculation program 234.

In the CPU unit 13 according to the present embodiments, a constant-period execution cycle (control cycle) suitable for the motion calculation program 234 is used as a shared cycle of an overall processing. Therefore, because all processes are unlikely to be completed within one control cycle, the processes to be executed are sorted according to a degree of priority into processes for which execution must be completed in each control cycle and processes which may be executed over a plurality of control cycles. The scheduler program 212 administrates an execution sequence and the like of the sorted processes. More specifically, the higher the degree of priority given the program, the sooner the scheduler program 212 executes the program within each control cycle duration.

The output processing program 214 reallocates the output data generated by execution of the user program 236 (the control program 230) in a format appropriate for transfer to the PLC system bus controller 120 and/or the field network controller 140. When the PLC system bus controller 120 or the field network controller 140 require an instruction from the microprocessor 100 for executing a transmission, the output processing program 214 issues the instruction.

The input processing program 216 reallocates the input data received by the PLC system bus controller 120 and/or the field network controller 140 in a format appropriate for use by the control program 230.

The sequence command calculation program 232 is a program called up when a given sequence command used by the user program 236 is executed. The sequence command calculation program 232 is executed to attain the contents of the command.

The motion calculation program 234 is a program that is executed according to an instruction by the user program 236 and calculates an instruction value output to a motor driver such as the servo motor driver 3 or the pulse motor driver each time the program is executed.

The other system programs 220 collectively refer to a suite of programs for achieving various functions of the PLC 1 other than those of the programs individually depicted in FIG. 3. The other system programs 220 include a control cycle period setting program 222.

A period of the control cycle can be set as desired, depending on a purpose of control. Typically, a user enters to the PLC support device 8 information specifying the period of the control cycle. Then, the entered information is transferred from the PLC support device 8 to the CPU unit 13. The control cycle period setting program 222 stores the information from the PLC support device 8 in the non-volatile memory 106 and also sets the system timer 108 such that an interrupt signal is generated at a period of a control cycle specified by the system timer 108. When power is supplied to the CPU unit 13, the control cycle period setting program 222 is executed. Thereby, the information specifying the period of the control cycle is retrieved from the non-volatile memory 106 and the system timer 108 is set based on the retrieved information.

A format of the information specifying the period of the control cycle can be a time value indicating the period of the control cycle or information (number or character) specifying one from a plurality of options prepared in advance for the period of the control cycle.

In the CPU unit 13 according to the present embodiments, means to set the period of the control cycle refer to elements used to set a desired period of the control cycle (a setter or a setting unit), including a configuration having a communication means (a communicator) for communicating with the PLC support device 8 used to obtain the information specifying the period of the control cycle, the control cycle period setting program 222, and the system timer 108 configured to be capable of setting a desired period of an interrupt signal that defines the control cycle. Instead of obtaining the information specifying the period of the control cycle from the PLC support device 8, an input device, such as an operation switch for receiving an input specifying the period of the control cycle, may be provided to the CPU unit 13 itself.

The realtime OS 200 provides an environment to switch between and execute a plurality of programs as time elapses. As an event (interrupt) to output (transmit) to other units or other devices output data generated by program execution by the CPU unit 13, an output preparation interrupt (P) and a field network transmission interrupt (X) are initially set in the PLC 1 according to the present embodiments. When the output preparation interrupt (P) or the field network transmission interrupt (X) is generated, the realtime OS 200 switches a program executed by the microprocessor 100 from a program being executed at the time of interruption to the scheduler program 212. When neither the scheduler program 212 nor a program whose execution is controlled by the scheduler program 212 is being executed, the realtime OS 200 executes another program included in the system program 210. Examples of such a program include a program related to communication processing between the CPU unit 13 and the PLC support device 8 through the connection cable 10 (USB) or the like.

In addition, the control program 230 and the scheduler program 212 are stored in the main memory 104 and the non-volatile memory 106, which are memory means.

D. Main Memory Configuration

Figure 4:
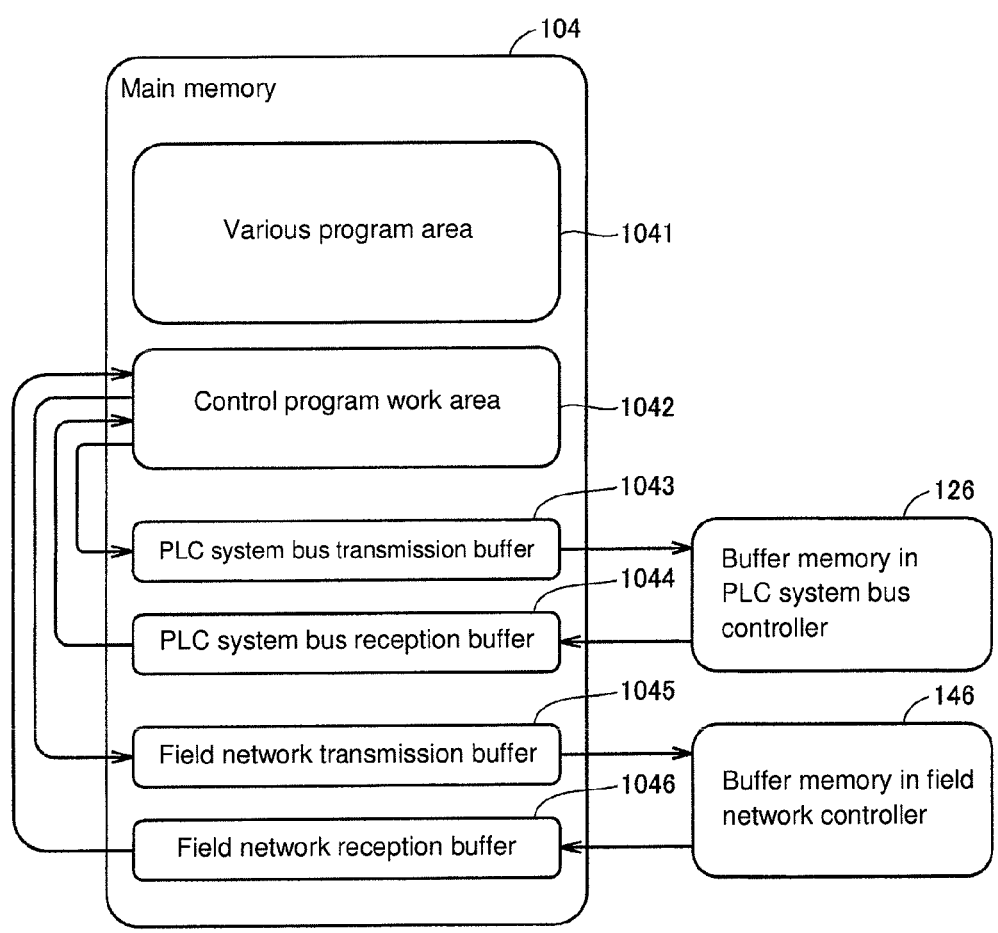
FIG. 4 is a schematic view illustrating a main memory area configuration in the CPU unit according to the embodiments of the present disclosure.

Next, with reference to FIG. 4, a description is given of a storage area configured in the main memory 104 of the CPU unit 13.

FIG. 4 is a schematic view illustrating a configuration of the main memory 104 area in the CPU unit 13 according to the embodiments of the present disclosure. With reference to FIG. 4, the main memory 104 includes a various program area 1041, a control program work area 1042, a PLC system bus transmission buffer 1043, a PLC system bus reception buffer 1044, a field network transmission buffer 1045, and a field network reception buffer 1046.

The various program area 1041 temporarily stores codes to execute various programs.

The control program work area 1042 temporarily stores output data generated by execution of the control program 230.

The PLC system bus transmission buffer 1043 and the PLC system bus reception buffer 1044 temporarily store data transmitted and received, respectively, through the PLC system bus 11. Similarly, the field network transmission buffer 1045 and the field network reception buffer 1046 temporarily store data transmitted and received, respectively, through the field network 2.

More specifically, when any output data are to be transmitted through the PLC system bus 11, the output processing program 214 copies the output data to be transmitted from the control program work area 1042 to the PLC system bus transmission buffer 1043. In this process, the output processing program 214 reallocates the output data such that an output data group intended for the same unit is grouped in the PLC system bus transmission buffer 1043 so that a plurality of output data transmitted to the same unit can be transmitted together.

Similarly, when any output data are to be transmitted through the field network 2, the output processing program 214 copies the output data to be transmitted from the control program work area 1042 to the field network transmission buffer 1045. In this process, the output processing program 214 reallocates the output data in a format for serial frame transmission in the field network transmission buffer 1045.

The input processing program 216 copies to the control program work area 1042 the input data received by the PLC system bus controller 120 and stored in the PLC system bus reception buffer 1044 and/or the input data received by the field network controller 140 and stored in the field network reception buffer 1046. In this process, the input processing program 216 reallocates the input data in a format suitable for use by the control program 230 in the control program work area 1042.

The DMA control circuit 122 of the PLC system bus controller 120 transfers the output data stored in the PLC system bus transmission buffer 1043 to the buffer memory 146 of the PLC system bus controller 120, and transfers the input data stored in the buffer memory 146 to the PLC system bus reception buffer 1044.

The DMA control circuit 142 of the field network controller 140 transfers the output data stored in the field network transmission buffer 1045 to the buffer memory 146 of the field network controller 140, and transfers the input data stored in the buffer memory 146 to the field network reception buffer 1046.

The control program work area 1042, the PLC system bus transmission buffer 1043, the PLC system bus reception buffer 1044, the field network transmission buffer 1045, and the field network reception buffer 1046 are configured to control access to one another independently. Thus, a plurality of operations (1) to (3) described below, for example, can be executed in parallel.

(1) Access to the control program work area 1042 by the microprocessor 100 in association with execution of the user program 236.

(2) Access to the PLC system bus transmission buffer 1043 and/or the PLC system bus reception buffer 1044 in the main memory 104 by the DMA control circuit 122 of the PLC system bus controller 120 for data transfer between the PLC system bus transmission buffer 1043 and/or the PLC system bus reception buffer 1044 in the main memory 104 and the buffer memory 126 in the PLC system bus controller 120.

(3) Access to the field network transmission buffer 1045 and/or the field network reception buffer 1046 in the main memory 104 by the DMA control circuit 142 of the field network controller 140 for data transfer between the field network transmission buffer 1045 and/or the field network reception buffer 1046 in the main memory 104 and the buffer memory 146 in the field network controller 140.

E. Overall Processing Operation

Embodiment 1

Figure 5:
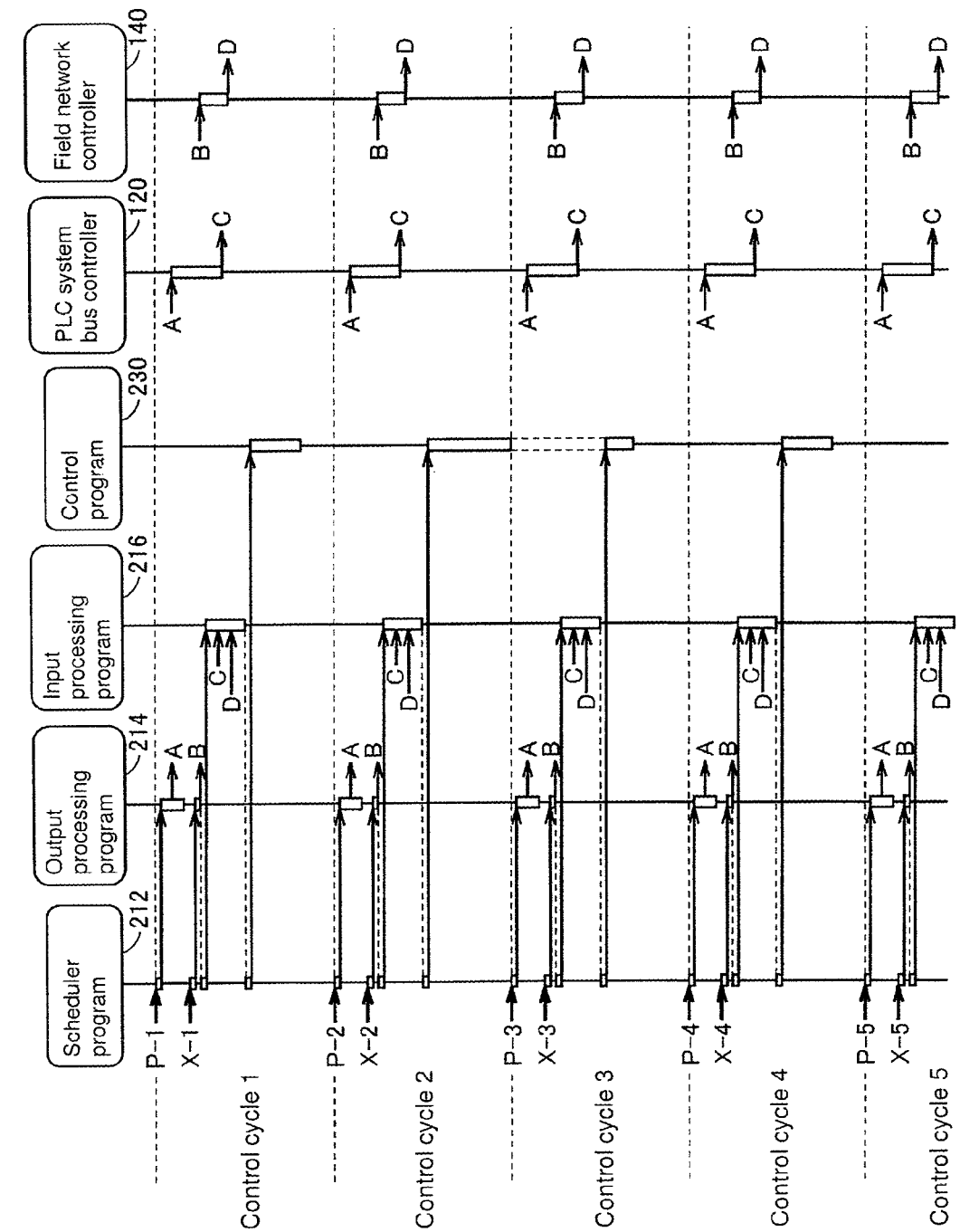
FIG. 5 is a sequence diagram illustrating an overall processing operation according to Embodiment 1 of the present disclosure.

Next, a description is given of an execution sequence of each program according to the present embodiment. In the present description, Embodiments 1 to 7 are shown as examples of embodiment of the technological thought according to the present disclosure. FIG. 5 is a sequence diagram illustrating an overall processing operation according to Embodiment 1 of the present disclosure.

In the present embodiment, a degree of priority is assigned to each of the output processing program 214, the input processing program 216, and the control program 230 (first control program). The priority order of these programs is, from highest to lowest, the output processing program 214, the input processing program 216, and the control program 230, for example.

The CPU unit 13 of the PLC 1 controls the control target by repeating transmission of output data (output processing program 214), reception of input data (input processing program 216), and execution of the control program 230 which generates output data using the input data. In other words, the microprocessor 100 executes the scheduler program 212 and the control program 230, which are stored in the memory means. According to a result of execution, the communication circuit (the PLC system bus controller 120 and/or the field network controller 140) performs transmission of the output data and reception of the input data for each control cycle.

The scheduler program 212 causes the microprocessor 100 to execute programs/threads in a high-priority order in each control cycle. To "cause the microprocessor 100 to execute" is also simply described as to "execute" hereafter.

The scheduler program 212 itself is not limited to an object instance, but may be a program (process) incorporated into another object instance of various kinds (for example, output processing program 214) and operated. For example, the scheduler program 212 may be a program retrieved in another object instance and operated.

Reference symbols P and X in FIG. 5 each denote an interrupt signal generated from the system timer 108 for every constant period (FIG. 2). Specifically, "P" denotes an output preparation interrupt and "X" denotes a field network transmission interrupt. In FIG. 5, the reference symbols denoting interrupts "P" and "X" are suffixed with numerals that represent control cycle numbers.

(e1: Control Cycle 1)

In response to an output preparation interrupt (P-1), the scheduler program 212 executes the output processing program 214 in accordance with the degree of priority.

When any output data are to be transmitted through the PLC system bus 11, the output processing program 214 copies the output data to be transmitted from the control program work area 1042 (FIG. 4) to the PLC system bus transmission buffer 1043. When any output data are to be transmitted through the field network 2, the output processing program 214 copies the output data to be transmitted from the control program work area 1042 to the field network transmission buffer 1045.

After copying of the output data to the PLC system bus transmission buffer 1043 is complete, the output processing program 214 instructs the PLC system bus controller 120 to execute transmission (reference symbol A). After copying of all the output data is complete, the output processing program 214 pauses execution.

Thereafter, in response to a field network transmission interrupt (X-1), the scheduler program 212 resumes execution of the output processing program 214.

After resuming execution, the output processing program 214 instructs the field network controller 140 to execute transmission (reference symbol B). Then, the output processing program 214 ends its own execution.

When the output processing program 214 ends execution, the scheduler program 212 then executes the input processing program 216 in accordance with the degree of priority.

The input processing program 216 waits until receiving a reception completion notification (reference symbol C) from the PLC system bus controller 120 or a reception completion notification (reference symbol D) from the field network controller 140. FIG. 5 illustrates an example in which the reception completion notification (reference symbol C) from the PLC system bus controller 120 is generated first, and then the reception completion notification (reference symbol D) from the field network controller 140 is generated. There may be a case, however, where the sequence of generation is reversed.

When the reception completion notification (reference symbol C or D) is generated, the input processing program 216 copies input data to the control program work area 1042 from the PLC system bus reception buffer 1044 or the field network reception buffer 1046 depending on which reception completion notification is generated.

Once copying of the input data is complete, the input processing program 216 ends execution. When the input processing program 216 ends execution, the scheduler program 212 then executes the control program 230 in accordance with the degree of priority.

The control program 230 performs processing using the input data stored in the control program work area 1042, and stores the output data, which is a result of processing, in the control program work area 1042.

During a period after execution of the control program 230 ends and before a next output preparation interrupt (P-2), the microprocessor 100 executes other system programs 220 (FIG. 2) using control of the realtime OS.

(e2: Operation of PLC System Bus Controller 120)

In response to the instruction to execute transmission (reference symbol A), the DMA control circuit 122 of the PLC system bus controller 120 transfers the output data stored in the PLC system bus transmission buffer 1043 of the main memory 104 to the buffer memory 126 of the PLC system bus controller 120.

Upon completion of the output data transfer to the buffer memory 126, the PLC system bus control circuit 124 transfers the output data to be transferred from the buffer memory 126 to a unit which is a destination of each output data. Thereafter, the PLC system bus control circuit 124 transfers input data from each unit of the PLC system bus 11 to the buffer memory 126 of the PLC system bus controller 120.

Upon completion of the input data transfer to the buffer memory 126, the DMA control circuit 122 of the PLC system bus controller 120 transfers the input data stored in the buffer memory 126 to the PLC system bus reception buffer 1044 of the main memory 104. Thereafter, upon completion of the input data transfer, the DMA control circuit 122 transmits the reception completion notification (reference symbol C) to the microprocessor 100.

(e3: Operation of Field Network Controller 140)

In response to the transmission execution instruction (reference symbol B), the DMA control circuit 142 of the field network controller 140 transfers the output data stored in the field network transmission buffer 1045 of the main memory 104 to the buffer memory 146 of the field network controller 140.

Upon completion of the output data transfer to the buffer memory 146, the field network control circuit 144 transfers the output data from the buffer memory 146 to a device which is a destination of each output data. Thereafter, the field network control circuit 144 transfers input data from each device on the field network 2 to the buffer memory 146 of the field network controller 140.

Upon completion of the input data transfer to the buffer memory 146, the DMA control circuit 142 of the field network controller 140 transfers the input data stored in the buffer memory 146 to the field network reception buffer 1046 of the main memory 104. Thereafter, upon completion of the input data transfer, the DMA control circuit 142 transmits the reception completion notification (reference symbol D) to the microprocessor 100.

The operations described above are carried out regardless of the type of the field network 2; however, when the field network 2 is EtherCAT® used in the present embodiment, the following processing is performed additionally.

Specifically, EtherCAT® includes the output data addressed to each unit and the input data from each unit in a single frame. When a frame is transmitted from the CPU unit 13 set as a master, the transmitted frame is sequentially transferred via each unit in a daisy chain connection. Each unit other than the CPU unit 13 is set as a slave. When the frame reaches a unit at an end, the frame doubles back in a full duplex communication channel and returns to the CPU unit 13 via each slave unit again. While an outbound frame passes in each slave in a FIFO (First In First Out) method, each slave selectively takes in the output data addressed to itself and also writes input data generated in itself in a proper position in the frame. Each slave lets a return frame pass itself without performing retrieval of the output data or writing of the input data.

As noted above, in the case of EtherCAT®, a frame is not individually transmitted to each unit or individually received from each unit. Instead, transmission and reception of a single frame corresponds to transfer of output data from the buffer memory 146 to each unit and transfer of input data from each unit to the buffer memory 146 by the field network control circuit 144.

In a case where EtherCAT® is employed as the field network 2, a frame containing output data is transmitted. When the frame returns via each slave unit, the frame contains input data. Thus, as an execution sequence, it is natural to perform input processing after output processing. However, depending on the type of the field network 2 being used, it may be preferable that the output processing be performed after the input processing. Thus, the sequence of the output processing and input processing may be designed as needed depending on specifications of the field network 2 or the like.

(e4: Control Cycles 2 to 4)

Fundamentally, operations in control cycles 2 to 4 are the same as the operation in the control cycle 1. Hereafter, a description is mainly given of differences from the operation in the control cycle 1.

In the control cycle 2, the control program 230 has not ended at the time when an output preparation interrupt of the control cycle 3 (P-3) is generated. Since an execution period of the control program 230 is the same as the period of the control cycle, it can be noted that exceeding of the execution period of the control program 230 occurs at this point. The control program 230 executed in the control cycle 2 is interrupted (the scheduler program 212 becomes an execution target) at this point, and the scheduler program 212 executes the output processing program 214 and the input processing program 216 of the control cycle 3. After the input processing program 216 completes execution, the scheduler program 212 resumes execution of the control program 230 (which was suspended when the control cycle 3 started), which was initiated in the control cycle 2, and executes an unexecuted portion of processing included in the control program 230.

Execution of the unexecuted portion of the control program 230 is completed during the control cycle 3. The scheduler program 212 does not newly initiate execution of the control program in the control cycle 3.

In the control cycle 4, a general operation is executed identical to the control cycle 1. In the output processing of the control cycle 3, execution of the control program 230, which was started in the control cycle 2, has not ended. Thus, new output data, which is a result of calculation, is not yet completely obtained. Therefore, the output data updated as a result of execution partway through the control program 230 and un-updated output data may be intermingled in the control program work area 1042. Thus, the output processing program 214 of the control cycle 3 instructs the PLC system bus controller 120 to execute transmission (reference symbol A) without copying the output data from the control program work area 1042 to the PLC system bus transmission buffer 1043 and/or the field network transmission buffer 1045.

Similar to the control cycles 1 and 2, the output processing program 214 of the control cycle 3 instructs the field network controller 140 to execute transmission (reference symbol B) according to an execution resume instruction from the scheduler program 212 responding to the field network transmission interrupt (X). Thereby, the output data, which was obtained in the control cycle 1 and remains in the PLC system bus transmission buffer 1043 and/or the field network transmission buffer 1045, is transmitted again.

As an example of alternative processing, instead of repeatedly transmitting the output data that has completed transmission as described above, the PLC system may be designed such that data indicating that the output data has not been updated is transmitted and each unit decides its own operation in such a case.

It is possible to obtain new input data from each unit in the control cycle 3 as well; however, there is no control program 230 which newly starts execution using this input data. Therefore, the input processing program 216 of the control cycle 3 does not copy the input data, which is stored in the PLC system bus reception buffer 1044 and the field network reception buffer 1046, to the control program work area 1042. This is because of inconvenience occurring when this copy operation is performed. In such a case, the input data is updated when the control program 230 resumes execution (that is, in the middle of execution of the single control program 230) in the control cycle 3.

The input processing program 216 of the control cycle 3 ends execution after verifying the reception completion notification (reference symbol C) from the PLC system bus controller 120 and the reception completion notification (D) from the field network controller 140.

In the example shown in FIG. 5, the control program 230, which started execution in the control cycle 2, does not end within the control cycle 2. Instead, the control program 230 executes the unexecuted portion and then ends an execution series in the control cycle 3. When the control program 230 does not end the series of execution even in the control cycle 3, execution is interrupted again at the beginning of the control cycle 4, and thereafter, the unexecuted portion is executed in the control cycle 4. In this case, processing in the control cycle 4 is similar to the processing in the control cycle 3 shown in FIG. 5.

(e5: Summary)

As noted above, the scheduler program 212 includes a command to cause the microprocessor 100 to start execution of the control program 230 after the transmission of output data and reception of input data by the communication circuit (the PLC system bus controller 120 and/or the field network controller 140) in a control cycle following a control cycle in which the control program 230 has ended execution. The scheduler program 212 further includes a command to cause the microprocessor 100 to execute an unexecuted portion of the control program 230 in a control cycle following a control cycle in which the control program 230 has not ended execution. Moreover, the scheduler program 212 includes a command to cause, when the control program 230 does not end execution within a control cycle, the communication circuit (the PLC system bus controller 120 and/or the field network controller 140) to execute in the next control cycle processing to start a communication in preference to execution of the unexecuted portion of the control program 230, and then to cause the microprocessor 100 to execute the unexecuted portion of the control program 230.

According to the present embodiment, in a situation where the execution time of the control program 230 sporadically becomes long, a period of the communication performed by the CPU unit 13 of the PLC 1 in synchronization with the control cycle to output and input control data can be a fixed amount of time that is shorter than the maximum execution time of the control program 230.

Since the period of the control data communication by the PLC 1 is constant, it becomes easy to make a period for updating the output signal constant, the output signal being provided to an external device from the I/O unit 14. Thus, it also becomes easy for the external device to operate in synchronization with the period of the control cycle of PLC 1.

Further, since the period of the control data communication is constant, a planned operation, which is precisely time-controlled, becomes possible, such as obtaining input data with the remote I/O terminal 5 from outside immediately before a scheduled time to transmit the input data to the CPU unit 13. Thereby, the CPU unit 13 can perform calculation processing using the newest obtainable input data. Therefore, also because of a shortened period of the control cycle, it is possible to shorten a response time from obtaining input data to transmitting output data, the output data being a result of calculation using the input data.

Further, since the period of the control data communication is constant, it is possible to promptly determine an occurrence of abnormal communication by detecting in either unit of the PLC 1 that a communication has not been performed at a scheduled time.

Further, the CPU unit 13 according to the present embodiment can also make constant the period of control data communication by the field network 2 when the CPU unit 13 directly communicates with the servo motor driver outside the PLC 1 via the field network 2. Thus, the motor can be controlled with a high degree of precision.

Moreover, in the CPU unit 13 according to the present embodiment, the communication circuit (the PLC system bus controller 120 and/or the field network controller 140) is configured so as to start transmission of output data and reception of input data controlled by the microprocessor 100. Further, the scheduler program 212 includes a command to cause the communication circuit to start communication at each control cycle. Thus, since the microprocessor 100 collectively administrates the control cycles, the communication circuit does not require special hardware for communicating at a constant period, which is advantageous.

F. Overall Processing Operation

Embodiment 2

Next, it is also practical to allow different degrees of priority to be set in the control program created according to a control purpose. In Embodiment 2, a processing operation is described in which a control program set to higher priority and a control program set to lower priority are included.

Figure 6:
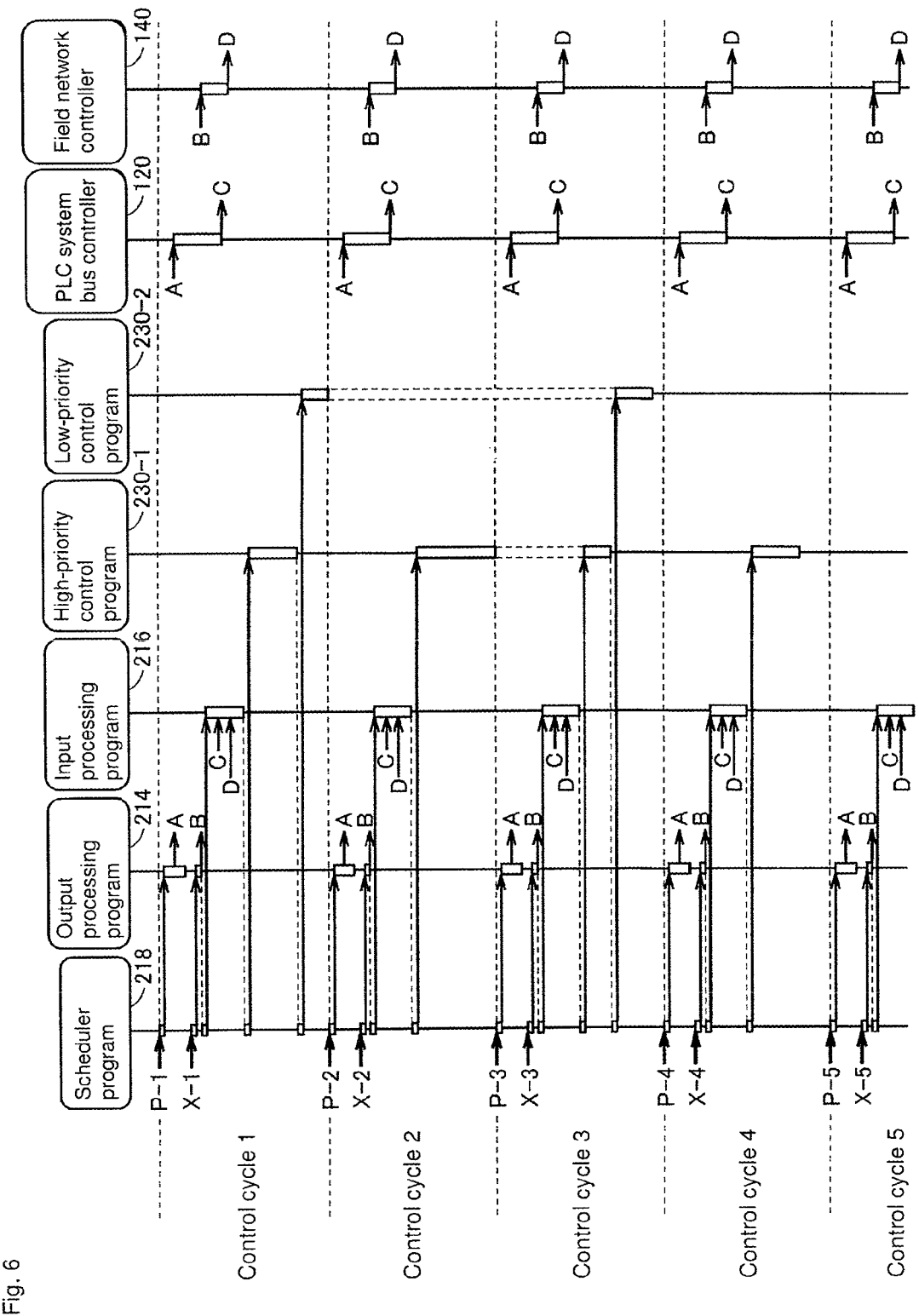
FIG. 6 is a sequence diagram illustrating an overall processing operation according to Embodiment 2 of the present disclosure.

FIG. 6 is a sequence diagram illustrating an overall processing operation according to Embodiment 2 of the present disclosure. Hereafter, a description is mainly given of differences from the sequence shown in FIG. 5.

In the present embodiment, for convenience in comparatively describing the programs, the control program 230 shown in FIG. 5 (first control program) is set to higher priority and is thus referred to as a "high-priority control program 230-1," and a program (second control program) set to lower priority is referred to as a "low-priority control program 230-2." In other words, the high-priority control program 230-1 in Embodiment 2 is substantially the same as the control program 230 in Embodiment 1 and is merely referred to differently for convenience of description.

The low-priority control program 230-2 has a priority of execution lower than the high-priority control program 230-1. Thus, an execution period of the low-priority control program 230-2 is set to an integer multiple of the control cycle period, the integer being 2 or greater. In the example in FIG. 6, a duration equivalent to four times that of the control cycle is defined as the execution period of the low-priority control program 230-2. In other words, the execution period of the low-priority control program 230-2 is four times a period of the high-priority control program 230-1. Moreover, the low-priority control program 230-2 is also stored in the main memory 104 and the non-volatile memory 106, which are memory means.

In the sequence shown in FIG. 6, the control cycles 1 to 4 correspond to one execution cycle of the low-priority control program 230-2, and the following execution cycle includes the control cycles 5 to 8.

With reference to FIG. 6, in the control cycle 1, when the high-priority control program 230-1 ends execution, the scheduler program 212 executes the low-priority control program 230-2. In this case, execution of the low-priority control program 230-2 is not completed within the control cycle 1 and is interrupted when the transmission preparation interrupt (P-2) is generated.

In the subsequent control cycle 2, when execution of the high-priority control program 230-1 does not end, an unexecuted portion of processing included in the low-priority control program 230-2 is not executed in the control cycle 2.

In the subsequent control cycle 3, when execution of the high-priority control program 230-1 ends, the scheduler program 212 executes the unexecuted portion of the processing included in the low-priority control program 230-2. Then, the low-priority control program 230-2 ends within the control cycle 3.

The execution period of the low-priority control program 230-2, which started in the control cycle 1, also includes the later control cycle 4. In the example shown in FIG. 6, however, the low-priority control program 230-2 has already ended execution within the control cycle 3, and thus the low-priority control program 230-2 is not executed within the control cycle 4.

In the control cycle 5, a new execution period for the low-priority control program 230-2 starts. Thus, similar to the control cycle 1, the scheduler program 212 starts execution of the low-priority control program 230-2 to execute processing from the beginning.

The low-priority control program 230-2, which started execution in the control cycle 1, is executed with the input data obtained through execution of the input processing program 216 in the control cycle 1. In addition, the output data obtained as a result of execution of the low-priority control program 230-2 is transmitted by execution of the output processing program 214 in the control cycle 5, which corresponds to a start time of the new execution cycle of the low-priority control program 230-2.

As noted above, the scheduler program 212 includes a command to cause the microprocessor 100 to execute the low-priority control program 230-2 in accordance with the execution cycle in a period within the control cycle after the high-priority control program 230-1 ends.

FIG. 6 shows an example in which output and input processing of the low-priority control program 230-2 is collectively performed with output and input processing of the high-priority control program 230-1. However, communication for output and input of the low-priority control program 230-2 may be performed at a different time from communication for the output and input of the high-priority control program 230-1. Even in such a case, when focusing on the communication for the output and input of the high-priority control program 230-1, the communication is performed at a constant period.

As noted above, when the plurality of control programs 230 having different degrees of priority for execution are performed in parallel, the control cycle corresponds to the execution cycle for a case where a highest-priority control program can execute without exceeding a period.

As noted above, the low-priority control program 230-2 incorporates and executes processing that is not influenced even when a period of the execution cycle thereof becomes longer than the period of the control cycle. Thereby, it is possible to reduce an amount of processing included in the high-priority control program 230-1. Thus, it is likely to shorten the period of the control cycle. It is also likely to reduce a frequency with which the high-priority control program 230-1 does not end execution within one control cycle. Moreover, it is likely to reduce a frequency with which the high-priority control program 230-1 does not end execution within a number of control cycles exceeding the expected number.

G. Overall Processing Operation

Embodiment 3

Next, a description is given of processing for a case in which the high-priority control program and the low-priority control program described in Embodiment 2 above are assigned to specific programs.

Figure 7:
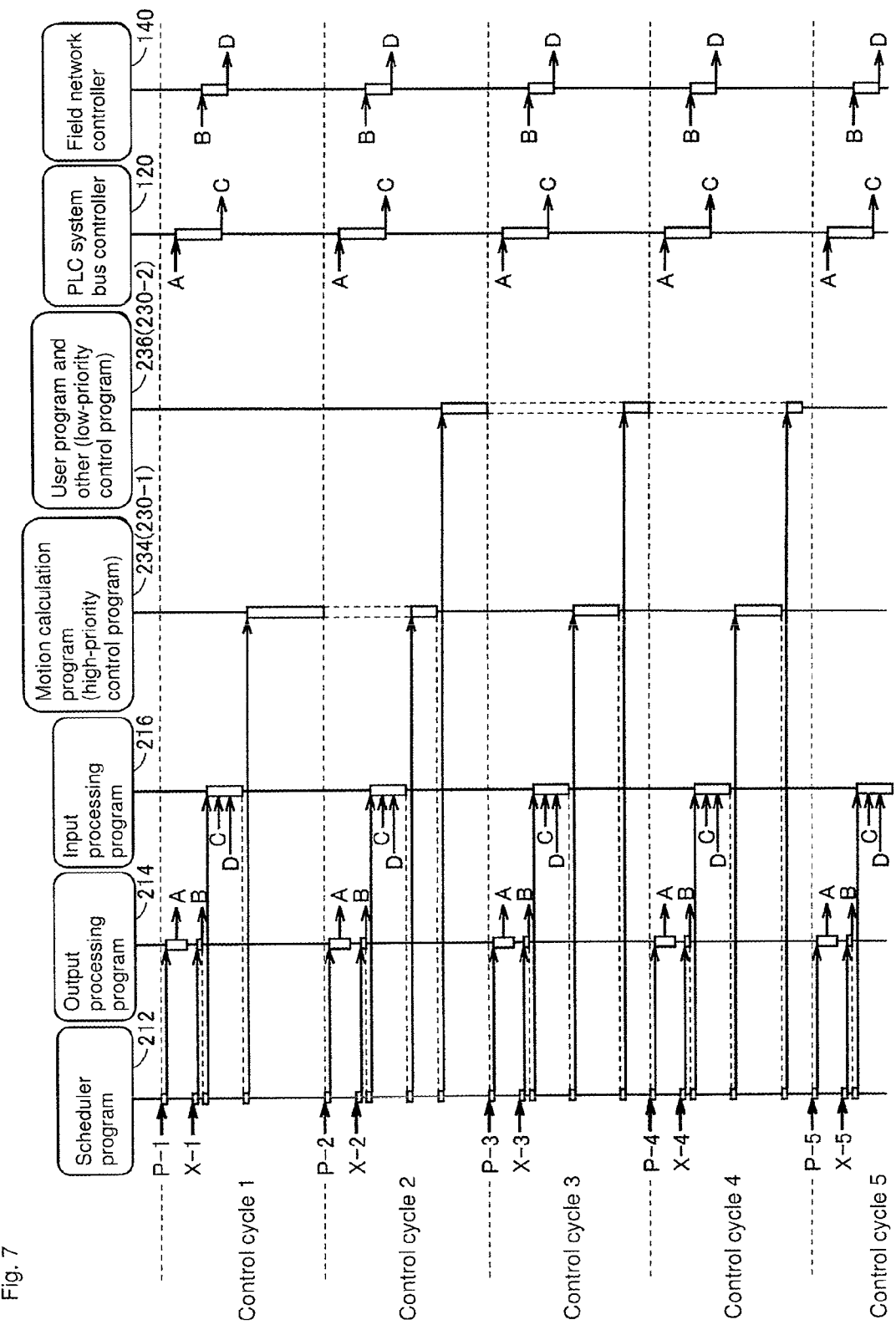
FIG. 7 is a sequence diagram illustrating an overall processing operation according to Embodiment 3 of the present disclosure.

FIG. 7 is a sequence diagram illustrating an overall processing operation according to Embodiment 3 of the present disclosure. As an example, in the sequence shown in FIG. 7, contents of the high-priority control program 230-1 are defined as a motion calculation program 234 and contents of the low-priority control program 230-2 are defined as the user program 236 and the sequence command calculation program 232 required for execution of the user program 236, both of the high-priority control program 230-1 and the low-priority control program 230-2 being shown in the sequence according to Embodiment 2. Hereafter, a description is mainly given of differences from the sequence in FIG. 5.

The motion calculation program 234, which is executed in accordance with a command included in the user program 236, calculates at every execution an instruction value output to a motor driver.

In the sequence shown in FIG. 7, the control cycles 1 to 4 correspond to one execution cycle of the user program 236. For example, in the next previous execution cycle, the user program 236 instructs the motion calculation program 234 to start.

In the control cycle 1, in response to the instruction from the user program 236, the motion calculation program 234 is started up. After the start-up, the motion calculation program 234 first executes initial processing called profile data generation. Profile data is required to sequentially calculate an instruction value for each axis of a control target every time the motion calculation program 234 is executed. The profile data is calculated using a parameter specified by a motion command in the user program 236. For example, using parameters such as a starting position, starting speed, target speed, acceleration, and jerk, each of which is specified by the motion command, an end time of acceleration increase (start time of constant acceleration motion), a start time of acceleration reduction, and a start time of constant speed motion are calculated from the motion start time. In addition, subsequent to the profile data generation, the motion calculation program 234 calculates a first instruction value within the execution cycle in which the program has started.

When the plurality of motion calculation programs 234 are simultaneously started up for numerous axes, generation of the profile data may not be completed for all the axes within one control cycle. The sequence in FIG. 7 shows such a case in which the motion calculation programs 234 do not end execution within one control cycle.

The control cycle 1 corresponds to a first control cycle (of four control cycles) included in one execution cycle of the user program 236. Since there is no surplus time generated for execution of the user program 236 and the like, the user program 236 is not executed in the control cycle 1.

In the present embodiment, in an initial execution started by the user program 236, which is generated in accordance with a control purpose of a user, the motion calculation program 234 requires execution time longer than an amount of time required for subsequent execution due to execution of the initial processing required to start calculation of the instruction value.

In response to the output preparation interrupt (P-1), execution of the motion calculation program 234 is interrupted. In the control cycle 2, the scheduler program 212 executes the output processing program 214 and the input processing program 216. Thereafter, the scheduler program 212 executes an unexecuted portion of processing included in the motion calculation program 234.

After the motion calculation program 234 ends, the scheduler program 212 executes the user program 236. The user program 236 calls up and executes the sequence command calculation program 232 as needed. Without ending within the control cycle 2, execution of the user program 236 is interrupted in response to the output preparation interrupt (P-3).

In and after the control cycle 3, the motion calculation program 234 only performs processing to calculate the instruction value and thus execution ends within each control cycle.

The sequence in FIG. 7 shows an example in which the user program 236 cannot end execution even within the control cycle 3 and execution ends in the control cycle 4 for the first time.

In addition, in the example of the sequence shown in FIG. 7, output data (including an instruction value to the motor driver) is not updated in the control cycle 2. However, since the motor has not started operation yet in the control cycle 2, few problems are caused by not updating the instruction value to the motor driver. The same can be applied to a case where the control program 230 shown in the sequence in FIG. 5 includes the motion calculation program 234 in addition to the user program 236.

Accordingly, when the control program 230 includes the motion calculation program 234, exceeding the execution period of the motion calculation program 234 does not occur in the control cycle after the control cycle in which the motion calculation program 234 started (motion start-up cycle). However, by setting the period of the control cycle so short that exceeding the execution cycle is likely to occur in the motion start-up cycle, it is possible to achieve motion control in which the period of the control cycle is short and the period is rarely exceeded during the motion operation.

H. Overall Processing Operation

Embodiment 4

Next, a description is given of processing for a case where an abnormal processing program is further incorporated in the sequence described above in Embodiment 1 to monitor and to notify/alert that the execution period is exceeded.

Figure 8:
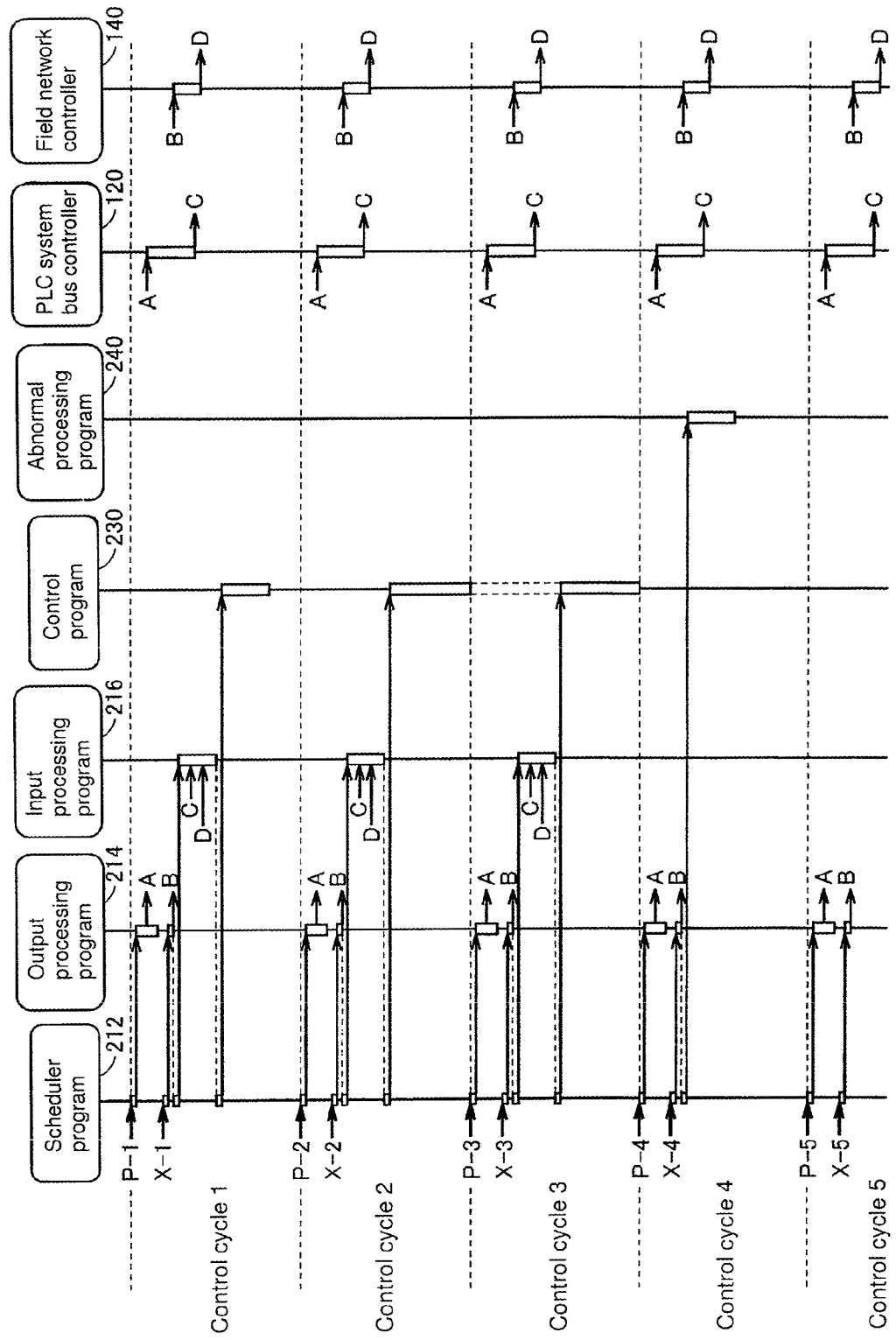
FIG. 8 is a sequence diagram illustrating an overall processing operation according to Embodiment 4 of the present disclosure.

FIG. 8 is a sequence diagram illustrating an overall processing operation according to Embodiment 4 of the present disclosure. With reference to FIG. 8, an abnormal processing program 240 is stored in a non-volatile memory as one program included in other system programs 220 shown in FIG. 3. Further, the abnormal processing program 240 is loaded in the main memory 104 after power is supplied to the PLC 1 so as to be executable. Hereafter, a description is mainly given of differences from the sequence shown in FIG. 5.

In the example of the sequence according to Embodiment 1 described above (FIG. 5), when the control program, which started execution in the control cycle 2, does not end execution within the control cycle 2 and does not end execution even in the control cycle 3, in which the unexecuted portion is executed, execution continues even in the control cycle 4. In this case, no limit is set on the number of control cycles over which one execution of the control program is continued. In contrast, in the present embodiment, when duration of continued execution by a single control program 230 reaches a count limit for the number of control cycles and when the control program 230 does not end execution within the number of control cycles corresponding to that count limit, the abnormal processing program 240 is executed in the following control cycle instead of the unexecuted portion of the processing included in the control program 230.

The count limit is a limit on the number of control cycles over which one execution of the control program 230 continues; in other words, the count limit defines execution conditions for the abnormal processing program 240. Count limit data (setting for the count limit) may be stored in the non-volatile memory 106 in advance at the time of producing the PLC 1. Alternatively, the user may store the count limit data in the non-volatile memory 106. A format of the count limit data may be any format with which the PLC can specify the count limit, including a format specifying a value of the count limit itself, a format specifying the number of control cycles for execution of the unexecuted portion of the control program (one smaller than the count limit), and information (number or character) specifying one from a plurality of options prepared in advance for the count limit.

The sequence in FIG. 8 shows an example of processing for a case in which the count limit is defined as "2." For the control program 230, which started execution in the control cycle 2, the control cycle 3 is the control cycle corresponding to the limit. When the control program 230, which started execution in the control cycle 2, does not end execution in the control cycle 3, the scheduler program 212, which is executed in response to an output preparation interrupt (P-4), detects that the number of the execution cycle (control cycle) of the control program 230 has reached the count limit and that the control program 230 has not ended execution. Then, after executing the output processing program 214, the scheduler program 212 executes the abnormal processing program 240. After execution of the abnormal processing program 240, the control program 230 need not be executed.

Typically, the abnormal processing program 240 performs processing to alert the outside of the PLC 1 that an abnormality has occurred, the abnormality being that the execution period has been exceeded. The abnormal processing program 240 performs processing such as lighting up a lamp (not shown in the drawings) mounted on the PLC 1 for alerting about an abnormality and transmitting data indicating that an abnormality has occurred to an administrator of the PLC1 via a superordinate network (not shown in the drawings), for example.

In and after the control cycle 5, the scheduler program 212 executes only the output processing program 214. This state continues until some kind of resolution action is taken, such action including resetting a power source or a proper abnormality resolution processing by the user with the PLC support device 8 connected via USB.

As noted above, the scheduler program 212 includes a command to cause the microprocessor 100 to execute the abnormal processing program 240 without executing the unexecuted portion of the control program 230 in the following control cycle when the number of the control cycles in which one execution of the control program 230 continues has reached the count limit and the control program 230 has not ended execution in the present control cycle.

In the present embodiment, even when an abnormality occurs, in which the execution period exceeds the limited number of control cycles, the output processing program 214 continues execution and the communication with the PLC system bus 11 and the field network 2 is maintained at the constant period. However, by employing processing that interrupts execution of the output processing program 214, the constant-period communication with the communication circuit may be stopped.

Further, the abnormal processing program 240 may be incorporated not as a program included in the system program 210 but as one special program included in the user program 236, so that the user can freely program the contents of abnormal processing.

According to the present embodiment, when an abnormal situation occurs, in which execution of the control program 230 continues for a number of control cycles beyond the expected number, the abnormal processing program 240 is executed while execution of the control program 230 is suspended, thereby ensuring improved safety.

I. Overall Processing Operation

Embodiment 5

Next, a description is given of processing for a case in which, when the control program has not ended within a control cycle in the sequence described above in Embodiment 1, only communication with the field network is performed in the following control cycle without performing communication with the PLC system bus.

Figure 9:
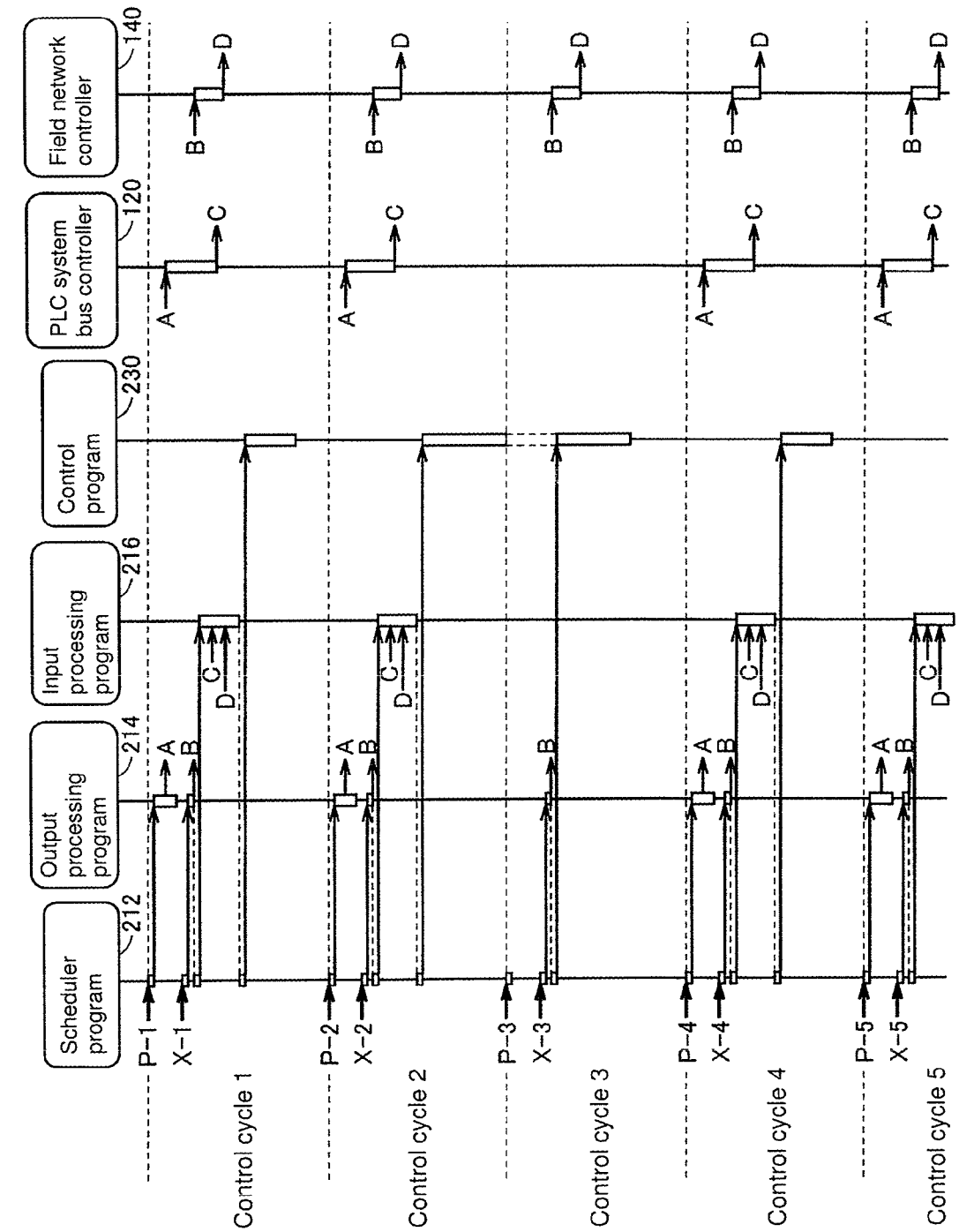
FIG. 9 is a sequence diagram illustrating an overall processing operation according to Embodiment 5 of the present disclosure.

FIG. 9 is a sequence diagram illustrating an overall processing operation according to Embodiment 5 of the present disclosure. Hereafter, a description is mainly given of differences from the sequence shown in FIG. 5.

The sequence in FIG. 9 shows a case in which the control program 230, which started execution in the control cycle 2, cannot end execution within the control cycle 2. In this case, in response to the output preparation interrupt (P-3), execution of the control program 230 is interrupted. Then, in response to the unfinished execution of the control program 230, the scheduler program 212 only executes processing for communication with the field network 2 in the control cycle 3 without executing processing for communication with the PLC system bus 11. In other words, the DMA control circuit 122 of the PLC system bus controller 120 skips a process to transfer the output data, which is stored in the PLC system bus transmission buffer 1043 of the main memory 104, to the buffer memory 126 of the PLC system bus controller 120 because the DMA control circuit 122 has not received the transmission execution instruction (reference symbol A).

Further, in the control cycle 3, since there is no updated output data to be output, the scheduler program 212 does not perform processing of a portion included in the output processing program 214 which prepares the output data to be transmitted via the PLC system bus 11. On the other hand, in response to a field network transmission interrupt (X-3), the scheduler program 212 executes processing of a portion included in the output processing program 214 which instructs the field network controller 140 to execute transmission. The scheduler program 212 also executes processing of a portion which prepares the output data to be transmitted via the field network 2. That is, the scheduler program 212 executes the output processing program 214 in response to the field network transmission interrupt (X-3).

In the sequence shown in FIG. 9, the scheduler program 212 executes none of the programs after generation of the output preparation interrupt (P-3) and before generation of the field network transmission interrupt (X-3). However, the control program may be executed in this period. In such a case, the control program 230 interrupts execution again in response to the field network transmission interrupt (X-3). Then, in response to the transmission execution instruction (reference symbol B) from the output processing program 214, the scheduler program 212 resumes execution of the control program 230. That is, the scheduler program executes the unexecuted portion of processing included in the control program 230 also in the time within a control cycle before the transmission instruction of the field network 2. This increases a possibility that the control program 230 can end execution within the control cycle 3.

According to the present embodiment, as long as the constant-period communication is performed via either of the communication paths (the PLC system bus 11 or the field network 2), effects of the present embodiment can be maintained because of the communication paths. In general, devices connected to the field network 2 are provided by many manufacturers based on published specifications for network communication. Since it is required to maintain compatibility among such devices, a need for maintaining a constant communication period is generally higher in the field network 2 than the PLC system bus 11 although it also depends on a specific specification of the field network.

J. Overall Processing Operation

Embodiment 6

Next, a description is given of a configuration in which the control program is more likely to end within an original execution cycle by allocating to a system timer a portion of scheduling processing by the scheduler program.

Figure 10:
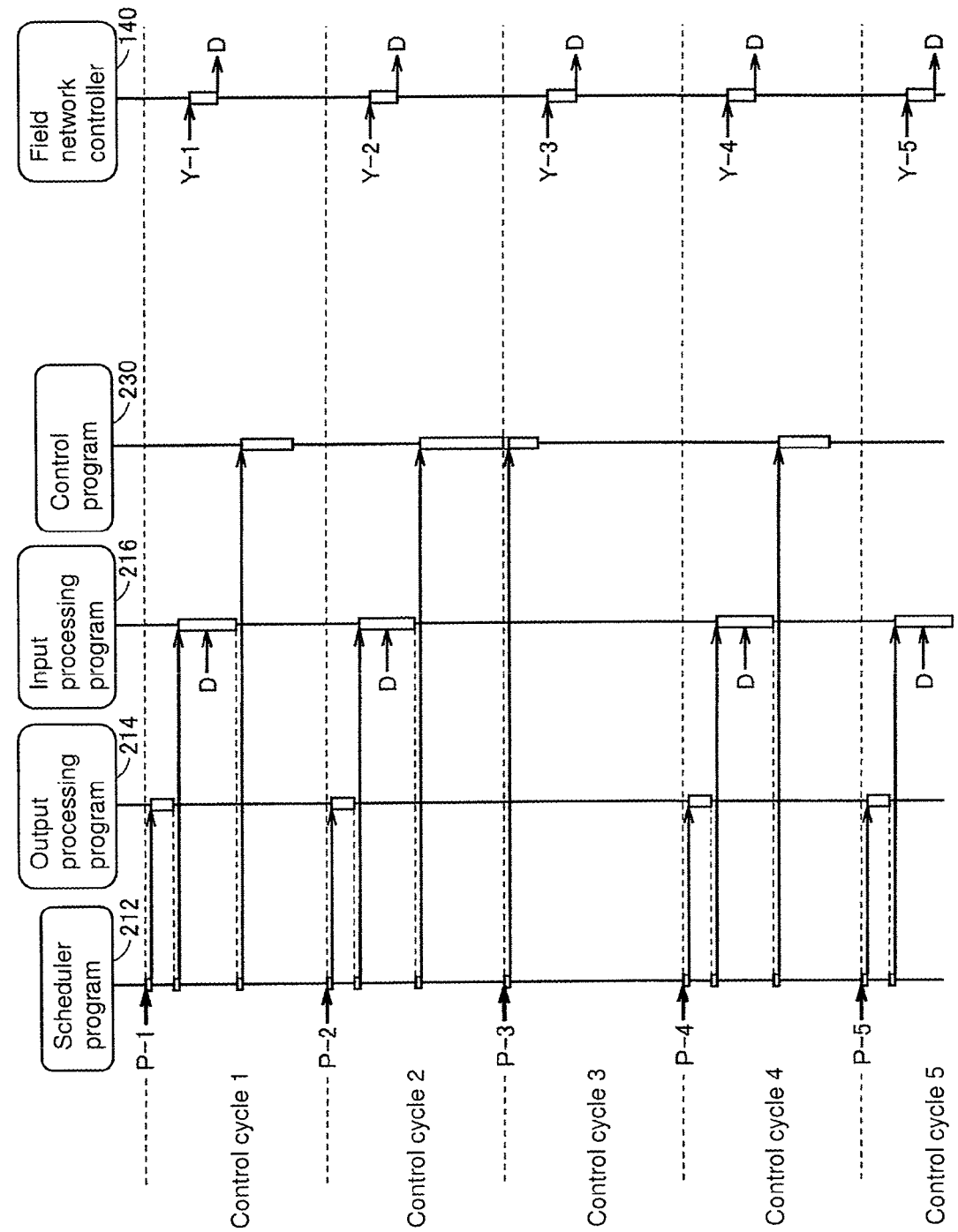
FIG. 10 is a sequence diagram illustrating an overall processing operation according to Embodiment 6 of the present disclosure.

FIG. 10 is a sequence diagram illustrating an overall processing operation according to Embodiment 6 of the present disclosure. Hereafter, a description is mainly given of differences from the sequence in FIG. 5. FIG. 10 shows an example in which a portion of the above-described scheduling processing of the scheduler program 212 is allocated to the system timer 108. Specifically, in the configuration shown in FIG. 10, the field network controller 140 performs a transmission operation not based on the transmission execution instruction (reference symbol B in FIG. 5) received from the scheduler program 212 but based on a transmission trigger signal (Y) directly received from the system timer 108, in the sequence described above in Embodiment 1.

In FIG. 10, the timing of the transmission trigger signal (Y) is set to the same timing as the field network transmission interrupt (X) in the sequence shown in FIG. 5. That is, the CPU unit 13 further includes a timer circuit which generates a signal with the period of the control cycle. Then, the communication circuit (field network controller 140) starts transmission of output data and reception of input data triggered by a signal generated by the timer circuit.

When the transmission preparation interrupt (P) is generated, the scheduler program 212 determines whether the control program 230 has ended execution. When the control program 230 has ended execution, the scheduler program 212 executes the output processing program 214 (the control cycles 1, 2, and 4). In contrast, when the control program 230 has not ended execution, the scheduler program 212 executes the unexecuted portion of processing included in the control program 230 (the control cycle 3).

For convenience of description, FIG. 10 shows an example in which transmission of output data and reception of input data are performed with only the field network 2, without the PLC system bus 11 or a unit on the PLC system bus 11. Similar to the above-described Embodiment 1, however, it may also be used together with the PLC system bus 11.

In addition, the system timer 108 may be mounted in the field network controller 140.

According to the present embodiment, start of communication with the communication circuit is triggered by a constant-period interrupt signal generated by the system timer 108, and thus, an amount of processing by the scheduler program 212 can be reduced. Therefore, in the control cycle in which the unexecuted portion of the processing included in the control program 230 is executed, the scheduler program 212 can allocate more time to execute the unexecuted portion of the processing included in the control program. As a result, execution of the unexecuted portion of the processing included in the control program 230 is more likely to be completed within the same control cycle.

K. Overall Processing Operation

Embodiment 7

Next, a description is given of processing using a microprocessor having a plurality of independent calculation agents. A microprocessor having a plurality of cores is available for use as a general-purpose computer architecture. Each core can independently perform calculation processing. A description is given of a configuration in which the control program is more likely to end within an original cycle by allocating execution of each program to the cores.

Figure 11:
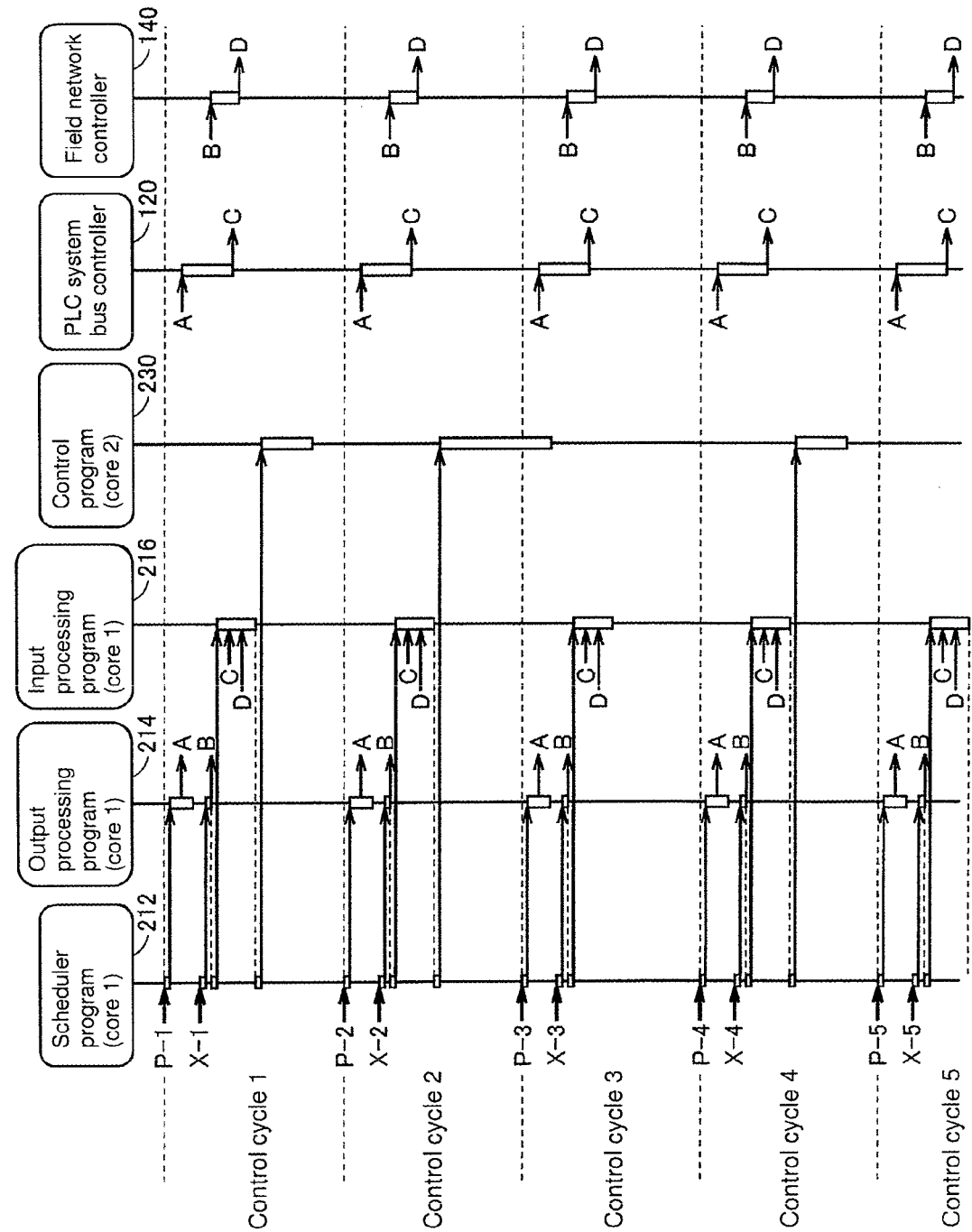
FIG. 11 is a sequence diagram illustrating an overall processing operation according to Embodiment 7 of the present disclosure.

FIG. 11 is a sequence diagram illustrating an overall processing operation according to Embodiment 7 of the present disclosure. Hereafter, a description is mainly given of differences from the sequence shown in FIG. 5.

The microprocessor 100, which performs the sequence shown in FIG. 11, has a core 1 and a core 2. As an example, the core 1 executes the scheduler program 212, the output processing program 214, and the input processing program 216; the core 2 executes the control program 230.

In the example shown in FIG. 11, the scheduler program 212 causes the core 2 to execute the control program 230 in the control cycles 1, 2, and 4.

For example, when the control program 230 does not end execution in the control cycle 2, the core 2 continues execution of the control program 230 in the control cycle 3. Specifically, the scheduler program 212 causes the core 2 to execute the unexecuted portion of the processing included in the control program 230 by not preventing the core 2 from continuing execution of the control program 230. In other words, the scheduler program 212 includes a command to cause the microprocessor 100 to execute the unexecuted portion of the control program 230 by not interrupting execution of the control program 230 in a control cycle following the control cycle in which the control program 230 has not ended execution. In this context, a portion of the system program 210 governing an execution control to continue execution of the control program 230 even when the transmission preparation interrupt (P) occurs (for example, an interrupt processing program that is started by the transmission preparation interrupt (P), a program instructing an OS 310 to perform execution control to continue execution of the control program 230 even when the transmission preparation interrupt (P) occurs, and the like) is called a scheduler program.

As a result, the control program 230 is more likely to end execution within the original control cycle.

L. Support Device

Next, a description is given of the PLC support device 8 performing creation of a program executed by the PLC 1, maintenance of the PLC 1, and the like.

Figure 12:
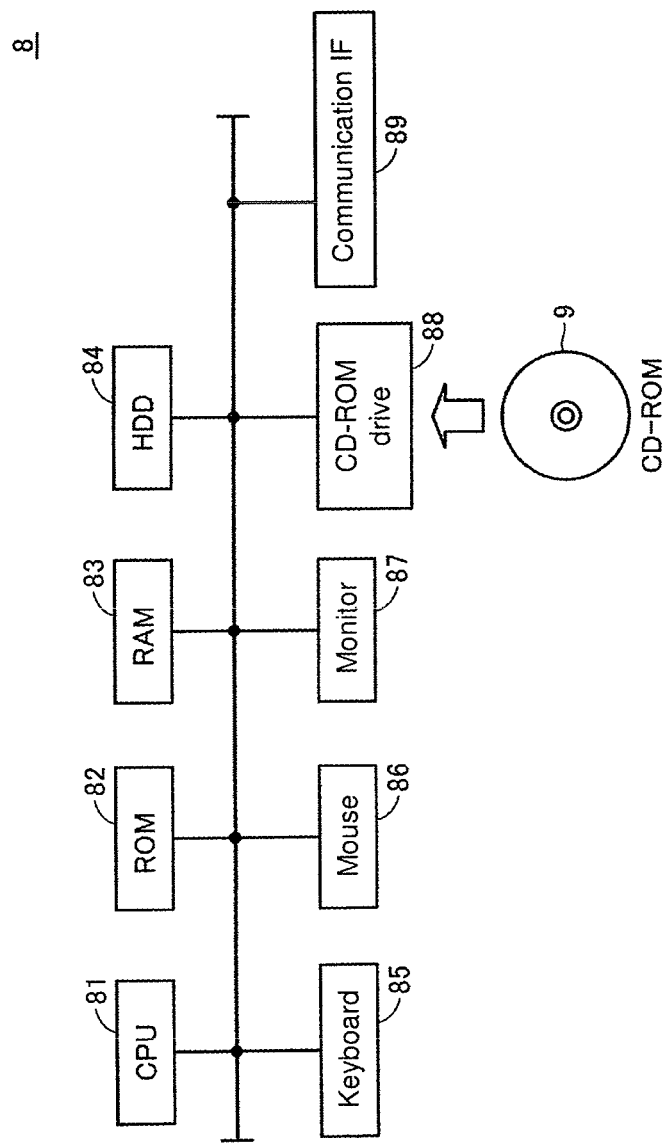
FIG. 12 is a schematic view illustrating a hardware configuration of a PLC support device connected to and used with the CPU unit according to the embodiments of the present disclosure.

FIG. 12 is a schematic view illustrating a hardware configuration of the PLC support device 8 connected to and used with the CPU unit according to the embodiment of the present disclosure. With reference to FIG. 12, the PLC support device 8 is typically configured with a general-purpose computer. From a viewpoint of maintainability, a laptop-type personal computer excellent in portability is preferable.

With reference to FIG. 12, the PLC support device 8 includes a CPU 81 executing various programs including an OS, a ROM (Read Only Memory) 82 storing BIOS and various data, a memory RAM 83 providing a work area that stores data required for execution of a program by the CPU 81, and a hard disk (HDD) 84 storing, in a non-volatile manner, a program and the like executed by the CPU 81.

The PLC support device 8 further includes a keyboard 85 and a mouse 86 receiving operation by the user, and a monitor 87 displaying information to the user. Furthermore, the PLC support device 8 includes a communication interface (IF) 89 to communicate with PLC 1 (CPU unit 13) and the like.

As noted below, the various programs executed in the PLC support device 8 are stored in a CD-ROM 9 for distribution. The programs stored in this CD-ROM 9 are read by a CD-ROM (Compact Disk-Read Only Memory) drive 88 and are stored in the hard disk (HDD) 84 and the like. Alternatively, a program may be downloaded via a network from a superordinate host computer and the like.

As noted above, the PLC support device 8 is embodied with a general-purpose computer, and a further detailed description for the PLC support device 8 is thus omitted.

Figure 13:
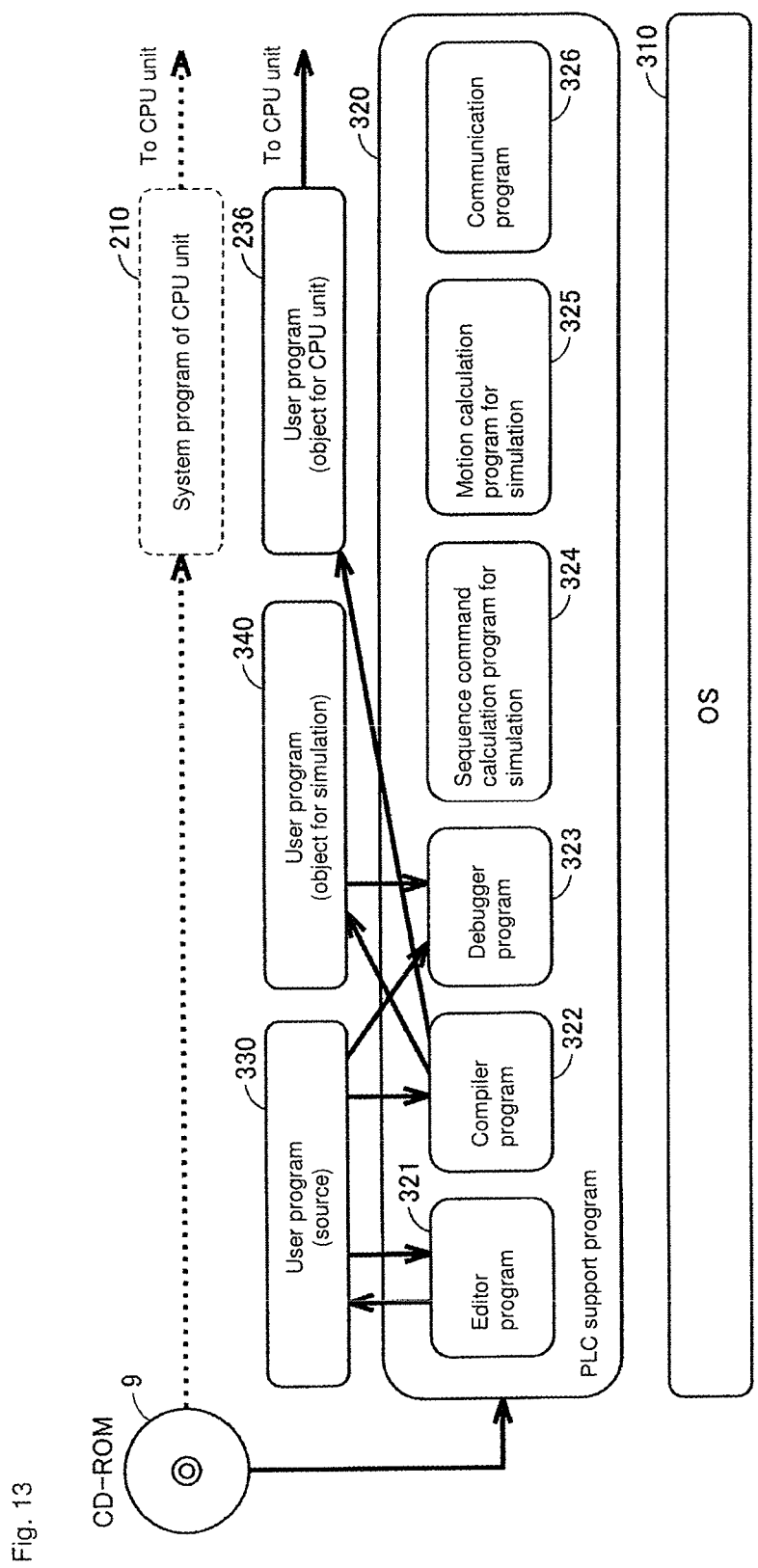
FIG. 13 is a schematic view illustrating a software configuration of the PLC support device connected to and used with the CPU unit according to the embodiments of the present disclosure.

FIG. 13 is a schematic view illustrating a software configuration of the PLC support device 8 connected to and used with the CPU unit according to the embodiment of the present disclosure. With reference to FIG. 13, the OS 310 is executed in the PLC support device 8 in order to provide an environment in which various programs included in a PLC support program 320 can be executed.

The PLC support program 320 includes an editor program 321, a compiler program 322, a debugger program 323, a sequence command calculation program for simulation 324, a motion calculation program for simulation 325, and a communication program 326. Each program included in the PLC support program 320 is typically distributed in a state of being stored in the CD-ROM 9 and is installed in the PLC support device 8.

The editor program 321 provides a function such as input and edit functions to create a user program 236. More specifically, in addition to a function with which the user creates a source program 330 of the user program 236 by operating the keyboard 85 and the mouse 86, the editor program 321 provides functions to save and edit the generated source program 330. Further, the editor program 321 receives input of the source program 330 from outside.

The compiler program 322 compiles the source program 330 to provide a function generating the user program 236 in an object program format that can be executed by the microprocessor 100 of the CPU unit 13. In addition, the compiler program 322 compiles the source program 330 to provide a function generating a user program 340 in an object program format that can be executed by the CPU 81 of the PLC support device 8. This user program 340 is an object program for simulation used to simulate (imitate) operation of the PLC 1 with the PLC support device 8.

The debugger program 323 provides a function debugging a source program of a user program. The debugging includes operations such as partial execution of a user-designated portion of a source program and tracking of temporal change in a variable value during execution of the source program.

The debugger program 323 further provides a function executing the user program 340, which is an object program for simulation. At the time of the simulation, the sequence command calculation program for simulation 324 and the motion calculation program for simulation 325 included in the PLC support program 320 are used in replacement of the sequence command calculation program 232 and the motion calculation program 234 included in the system program of the CPU unit 13.

The communication program 326 provides a function transferring the user program 236 to the CPU unit 13 of the PLC 1.

In general, the system program 210 provided to the PLC 1 is stored in the non-volatile memory 106 of the CPU unit 13 at a stage of manufacturing the CPU unit 13. However, when the system program 210 is stored in the CD-ROM 9, the user can copy the system program 210 in the CD-ROM 9 to the PLC support device 8 and transfer the copied system program 210 to the CPU unit 13 using the function provided by the communication program 326. Moreover, when a realtime OS 200 to be executed by the CPU unit 13 of the PLC 1 is stored in CD-ROM 9, the realtime OS 200 can be also re-installed in the PLC 1 by a user operation.

The embodiments disclosed here should be considered as examples and not as limitation of the present disclosure in all aspects. The scope of the present disclosure is indicated not by the description above but by the scope of claims. The scope of the present disclosure is intended to include all modifications without departing from the scope of the claims and the meaning and scope of equivalents.

REFERENCE SIGNS LIST

1 PLC, 2 Field network, 3 Servo motor driver, 4 Servo motor, 5 Remote I/O terminal, 6 detection switch, 7 Relay, 8 PLC support device, 9 CD-ROM, 10 Connection cable, 11 PLC system bus, 12 Power supply unit, 13 CPU unit, 14, 53 I/O unit, 15 Specialty unit, 51 Remote I/O terminal bus, 52 Communication coupler, 81 CPU, 83 RAM, 85 Keyboard, 86 Mouse, 87 Monitor, 88 CD-ROM drive, 100 Microprocessor, 102 Chip set, 104 Main memory, 106 Non-volatile memory, 108 System timer, 110 USB connector, 120 PLC system bus controller, 122 DMA control circuit, 124 PLC system bus control circuit, 126, 146 Buffer memory, 130 PLC system bus connector, 140 Field network controller, 142 DMA control circuit, 144 Field network control circuit, 200 Realtime OS, 210 System program, 212 Scheduler program, 214 Output processing program, 216 input processing program, 218 I/O processing program, 220 Other system program, 222 Control cycle period setting program, 230 Control program, 230-1 High-priority control program, 230-2 Low-priority control program, 232 Sequence command calculation program, 234 Motion calculation program, 236 User program, 240 Abnormal processing program, 320 PLC support program, 321 Editor program, 322 Compiler program, 323 Debugger program, 324 Sequence command calculation program for simulation, 325 Motion calculation program for simulation, 326 Communication program, 330 Source program, 340 User program, 1041 Program area, 1042 Control program work area, 1043 PLC system bus transmission buffer, 1044 PLC system bus reception buffer, 1045 Field network transmission buffer, 1046 Field network reception buffer.

What is claimed is:

1. A central processing unit (CPU) of a programmable logic controller (PLC), the CPU comprising:
  a microprocessor that executes a first control program and a scheduler program, the first control program, when executed by the microprocessor, generates output data using input data, and the scheduler program, when executed by the microprocessor, controls execution of the first control program;
  a memory that stores the first control program and the scheduler program;
  a setting unit that determines a period of a control cycle; and
  a communication circuit that transmits the output data and receives the input data for every control cycle;
  the scheduler program, when executed by the microprocessor,
    causes the microprocessor to start execution of the first control program after the communication circuit transmits the output data and receives the input data, in a control cycle following a control cycle in which the first control program has ended; and
    causes the microprocessor to execute an unexecuted portion of the first control program in a control cycle following a control cycle in which the first control program has not ended,
  wherein the CPU is configured to control a control target of the PLC by repeating transmission of the output data, reception of the input data, and execution of the first control program.

2. The CPU of the PLC according to claim 1, wherein the first control program further includes a motion calculation program, that when executed by the microprocessor, calculates an instruction value to be output to a motor driver, and wherein
  the motion calculation program requires an amount of time for a first execution longer than an amount of time for a subsequent execution, the first execution requires initial processing to start calculation of the instruction value, and the first execution is started by a user program created in accordance with a control instruction of a user.

3. The CPU of the PLC according to claim 2, wherein the first control program further includes the user program.

4. The CPU of the PLC according to claim 1, wherein the memory further stores a second control program, a period of an execution cycle of the second control program being at least twice as fast as the period of the control cycle, and
wherein the scheduler program, when executed by the microprocessor, causes the microprocessor to execute the second control program in accordance with the execution cycle within the control cycle and after completion of the first control program.

5. The CPU of the PLC according to claim 2, wherein the memory further stores a second control program, a period of an execution cycle of the second control program being at least twice as fast as the period of the control cycle,
wherein the scheduler program, when executed by the microprocessor, causes the microprocessor to execute the second control program in accordance with the execution cycle within the control cycle and after completion of the first control program,
wherein the first control program includes the motion calculation program, and
wherein the second control program includes the user program.

6. The CPU of the PLC according to claim 1, wherein the memory further stores setting information and an abnormal processing program, in which the setting information sets a count limit for a number of control cycles over which the first control program continues one execution, and the abnormal processing program is executed by the microprocessor when the number of control cycles is over the count limit, and wherein
the scheduler program, when executed by the microprocessor, and when the number of control cycles reaches the count limit and when execution of the first control program has not ended within the control cycle, executes the abnormal processing program without executing the unexecuted portion of the first control program in the following control cycle.

7. The CPU of the PLC according to claim 1, wherein the communication circuit is configured to start transmission of the output data and reception of the input data controlled by the microprocessor, and wherein
the scheduler program, when executed by the microprocessor causes the communication circuit to start the communication for every control cycle.

8. The CPU of the PLC according to claim 7, wherein the scheduler program, when executed by the microprocessor, and when execution of the first control program has not ended within a control cycle, causes the communication circuit to start the communication and then executes the unexecuted portion of the first control program in the following control cycle.

9. The CPU of the PLC according to claim 1, wherein the CPU further comprises a timer circuit generating a signal with the period of the control cycle, and wherein
the communication circuit is configured to start transmission of the output data and reception of the input data, triggered by the signal generated by the timer circuit.

10. The CPU of the PLC according to one of claim 1, wherein the microprocessor includes a first core and a second core,
the first core executes the scheduler program, and the second core executes the first control program, and the scheduler program, when executed by the microprocessor, executes the unexecuted portion of the first control program in the control cycle following the control cycle in which execution of the first control program has not ended so that the execution of the first control program is not interrupted.

11. A system for controlling programmable logic controller (PLC) comprising:
a memory that stores executable instructions;
a microprocessor of a central processing unit (CPU) that executes the executable instructions; and
a communication circuit configured to transmit output data and receive input data, wherein the CPU controls a control target by repeating, for each control cycle, transmission of the output data and reception of the input data with the communication circuit, and by repeating execution of a first control program which is stored in the memory and generates the output data using the input data,
wherein a scheduler controls execution of the first control program; and
a setting unit sets a period of a control cycle,
wherein the scheduler causes the microprocessor to start execution of the first control program after the communication circuit transmits the output data and receives the input data, in a control cycle following a control cycle in which the first control program has ended execution, and
wherein the scheduler causes the microprocessor to execute an unexecuted portion of the first control program in a control cycle following a control cycle in which the first control program has not ended execution.

12. The system according to claim 11, wherein the PLC further comprises a motion calculator that is at least a portion of the first control program and calculates at every execution an instruction value output to a motor driver, and
wherein the motion calculator requires an amount of time for a first execution longer than an amount of time required for subsequent execution due to execution of initial processing required to start calculation of the instruction value in the first execution.

13. A non-transitory computer readable storage medium encoded with an executable computer program for a PLC and that, when executed by a microprocessor, causes the microprocessor to perform operations comprising:
transmitting output data and receiving input data via a communication circuit;
controlling a control target by repeating, for each control cycle, transmission of the output data and reception of the input data with the communication circuit, and by repeating execution of a first control program that generates the output data using the input data;
controlling execution of the first control program;
setting a period of a control cycle;
starting execution of the first control program after the communication circuit transmits the output data and receives the input data, in a control cycle following a control cycle in which the first control program has ended execution; and
executing an unexecuted portion of the first control program in a control cycle following a control cycle in which the first control program has not ended execution.

14. The non-transitory computer readable storage medium according to claim 13, the operations further comprising:

calculating an instruction value output to a motor driver, wherein an amount of time for a first calculation of an instruction value is longer than an amount of time required for subsequent calculation of an instruction value due to initial processing required to start a calculation of motion instruction data generated in accordance with a control instruction of a user.

* * * * *